(12) United States Patent
Takamizawa et al.

(10) Patent No.: US 12,056,826 B2
(45) Date of Patent: Aug. 6, 2024

(54) HEAD-MOUNTED INFORMATION PROCESSING APPARATUS AND HEAD-MOUNTED DISPLAY SYSTEM

(71) Applicant: Maxell, Ltd., Kyoto (JP)

(72) Inventors: Naohisa Takamizawa, Kyoto (JP); Yasunobu Hashimoto, Kyoto (JP); Yoshinori Okada, Kyoto (JP)

(73) Assignee: MAXELL, LTD., Kyoto (JP)

( * ) Notice: Subject to any disclaimer, the term of this patent is extended or adjusted under 35 U.S.C. 154(b) by 24 days.

(21) Appl. No.: 17/436,079

(22) PCT Filed: Mar. 6, 2019

(86) PCT No.: PCT/JP2019/008931
§ 371 (c)(1),
(2) Date: Sep. 3, 2021

(87) PCT Pub. No.: WO2020/179027
PCT Pub. Date: Sep. 10, 2020

(65) Prior Publication Data
US 2022/0172439 A1    Jun. 2, 2022

(51) Int. Cl.
*G06T 19/00* (2011.01)
*G06T 3/40* (2006.01)
*G06T 19/20* (2011.01)

(52) U.S. Cl.
CPC .............. *G06T 19/006* (2013.01); *G06T 3/40* (2013.01); *G06T 19/20* (2013.01)

(58) Field of Classification Search
None
See application file for complete search history.

(56) References Cited

U.S. PATENT DOCUMENTS 10,489,981 B2    11/2019    Fukazawa et al.
11,036,351 B2     6/2021    Fukazawa et al.
(Continued)

FOREIGN PATENT DOCUMENTS

JP    2005-251118 A    9/2005
JP    2009-244936 A   10/2009
(Continued)

OTHER PUBLICATIONS

Office Action issued Oct. 4, 2022 in Japanese Patent Application No. 2021-503345, 3 pages.
(Continued)

*Primary Examiner* — Robert J Craddock
(74) *Attorney, Agent, or Firm* — XSENSUS LLP

(57) ABSTRACT

The existence position of the virtual object displayed by the virtual reality or augmented reality is easily grasped. In a head-mounted information processing apparatus 100, a virtual object generation processor 122 generates a virtual object. An input operation unit 121 sets and inputs information. A camera 111 captures a real space. A display unit 130 displays a photographed image captured by the camera 111 and the virtual object generated by the virtual object generation processor 122. The controller 125 controls the virtual object generation processor 122 and the display unit 130. The controller 125 displays the virtual objects generated by the virtual object generation processor 122 in a batch within a display visual field screen of the display unit 130 in accordance with virtual object display instruction information for instructing display of the virtual object input from the input operation unit 121.

20 Claims, 15 Drawing Sheets

(56) References Cited

U.S. PATENT DOCUMENTS

| | | |
|---|---|---|
| 2012/0210255 A1 | 8/2012 | Ooi et al. |
| 2012/0242678 A1* | 9/2012 | Border .............. G02B 27/0093 345/589 |
| 2016/0055676 A1 | 2/2016 | Kasahara et al. |
| 2016/0284131 A1 | 9/2016 | Koga |
| 2017/0105052 A1* | 4/2017 | DeFaria ............. H04N 21/2143 |
| 2017/0124765 A1 | 5/2017 | Imamura |
| 2017/0309079 A1 | 10/2017 | Naples et al. |
| 2018/0059788 A1 | 3/2018 | Noguchi et al. |
| 2018/0136816 A1 | 5/2018 | Tao et al. |
| 2019/0232500 A1* | 8/2019 | Bennett ................ G06T 19/006 |

FOREIGN PATENT DOCUMENTS

| | | |
|---|---|---|
| JP | 2012-168798 A | 9/2012 |
| JP | 2016-184296 A | 10/2016 |
| JP | 2017-027206 A | 2/2017 |
| JP | 2017-84117 A | 5/2017 |
| JP | 2018-032132 A | 3/2018 |
| WO | 2014/162825 A1 | 10/2014 |
| WO | 2016/170717 A1 | 10/2016 |
| WO | 2017/098822 A1 | 6/2017 |
| WO | 2018/042658 A1 | 3/2018 |
| WO | 2019/026713 A1 | 2/2019 |

OTHER PUBLICATIONS

International Search Report and Written Opinion mailed on May 28, 2019, received for PCT Application PCT/JP2019/008931, Filed on Mar. 6, 2019, 9 pages including English Translation.

Notification of Reasons for Refusal issued Dec. 5, 2023 issued in corresponding Japanese Patent Application No. 2023-069361 and computer-generated English translation thereof.

\* cited by examiner (a)

(b)

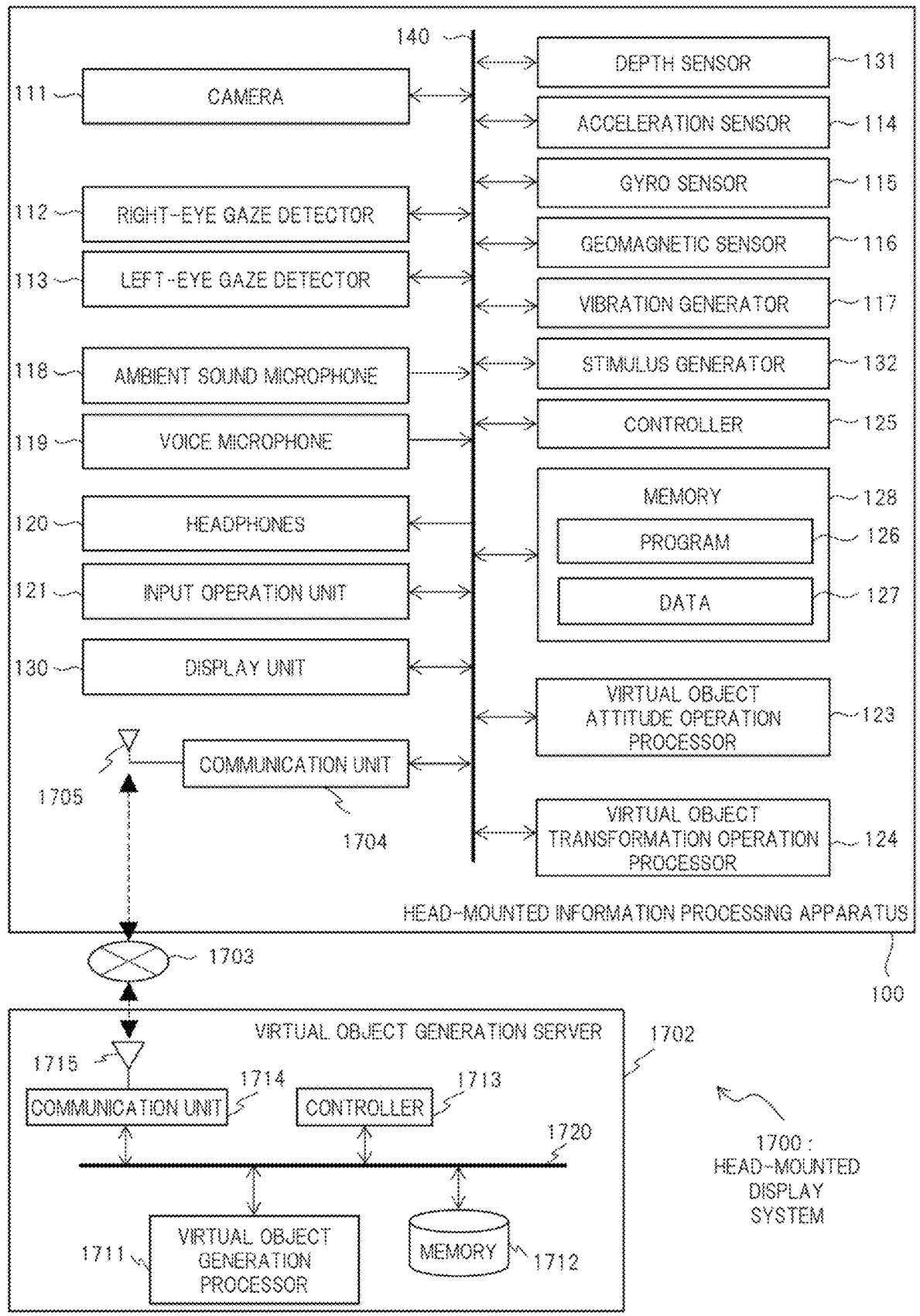

HEAD-MOUNTED INFORMATION PROCESSING APPARATUS AND HEAD-MOUNTED DISPLAY SYSTEM

CROSS-REFERENCE TO RELATED APPLICATIONS

The present application is based on PCT filing PCT/JP2019/008931, filed Mar. 6, 2019, the entire contents of which are incorporated herein by reference.

TECHNICAL FIELD

The present invention relates to a head-mounted information processing apparatus and a head-mounted display system, and particularly relates to a technology effective to grasp a position of a virtual object.

BACKGROUND ART

In recent years, virtual reality (VR) technology and augmented reality (AR) technology have been used for games and various simulations. The virtual reality is a technology that creates a virtual world that resembles the real world and gives you the feeling as if you are there. The augmented reality is a technology in which the virtual space (virtual object) created by CG (Computer Graphics) by adding digital information to the real world is augmented by reflecting it to the real world.

As a tool that embodies these technologies, a head-mounted information processing apparatus configured to mount a display unit, a camera, and the like on the head has been widely used. This type of head-mounted information processing apparatus structurally has a limitation in the display range, which causes the problem of narrow visual field range.

In the technology for solving this problem, for example, the visual field is widened by generating a wide visual field image obtained by appropriately expanding the visual field in the virtual space, so that even the virtual objects that are previously out of the visual field can be appropriately displayed (see, for example, Patent Document 1).

RELATED ART DOCUMENTS

Patent Documents

Patent Document 1: Japanese Unexamined Patent Application Publication No. 2009-244936

SUMMARY OF THE INVENTION

Problems to be Solved by the Invention

In the technology of Patent Document 1, as described above, the visual field in the virtual space is expanded to display the virtual objects in a wide range. However, there is a problem that, when the virtual object is placed behind a real object in the augmented reality (AR) space, a photographed object representing the real world, or another virtual object in the virtual reality (VR) space, the existence of the virtual object itself cannot be visually recognized no matter how much the visual field is expanded.

An object of the present invention is to provide a technology capable of easily grasping the existence position of a virtual object or the like displayed by the virtual reality or the augmented reality.

The above and other objects and novel features of the present invention will become apparent from the descriptions of this specification and accompanying drawings.

Means for Solving the Problem

An outline of the typical invention disclosed in this application will be briefly described as follows.

That is, a typical head-mounted information processing apparatus includes a virtual object generation processor, an input operation unit, a camera, a display unit, and a controller. The virtual object generation processor is configured to generate a virtual object. The input operation unit is configured to set and input information.

The camera is configured to capture a real space. The display unit is configured to display a photographed image captured by the camera and the virtual object generated by the virtual object generation processor. The controller is configured to control the virtual object generation processor and the display unit.

The controller displays the virtual objects generated by the virtual object generation processor in a batch within a display visual field screen of the display unit in accordance with virtual object display instruction information for instructing display of the virtual object input from the input operation unit.

Effect of the Invention

An effect achieved by the typical invention disclosed in this application will be briefly described as follows.

Since it is possible to visually recognize the arrangement position of a virtual object or the like accurately, it is possible to improve the convenience.

BRIEF DESCRIPTIONS OF THE DRAWINGS

FIG. 20 is a block diagram showing an example of a configuration in a head-mounted display system according to the second embodiment.

DETAILED DESCRIPTION OF PREFERRED EMBODIMENTS

Figure 1:
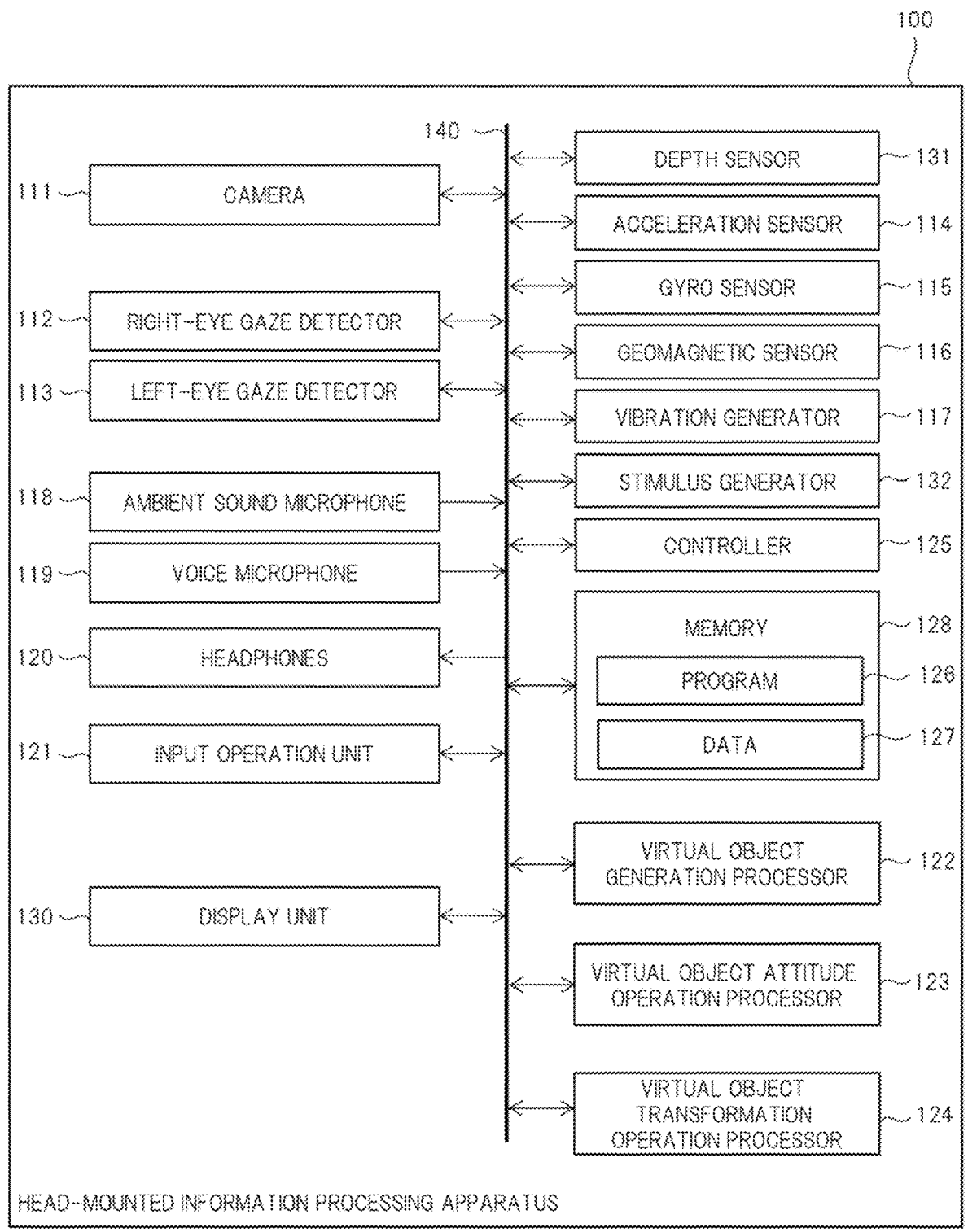
FIG. 1 is a block diagram showing an example of a configuration in a head-mounted information processing apparatus according to the first embodiment.

In all the drawings for describing the embodiments, the same components are denoted by the same reference characters in principle, and the repetitive description thereof will be omitted.

First Embodiment

Embodiments will be described in detail below.

Configuration Example of Head-Mounted Information Processing Apparatus

FIG. 1 is a block diagram showing an example of a configuration in a head-mounted information processing apparatus 100 according to the first embodiment.

As shown in FIG. 1, the head-mounted information processing apparatus 100 includes a camera 111, a right-eye gaze detector 112, a left-eye gaze detector 113, an acceleration sensor 114, a gyro sensor 115, a geomagnetic sensor 116, a vibration generator 117, an ambient sound microphone 118, a voice microphone 119, headphones 120, an input operation unit 121, a virtual object generation processor 122, a virtual object attitude operation processor 123, a virtual object transformation operation processor 124, a controller 125, a memory 128, a display unit 130, a depth sensor 131, a stimulus generator 132, and the like. Each of these functional blocks is connected to each other via a bus 140.

The camera 111 is installed in the head-mounted information processing apparatus 100, and captures a scenery around a user. The camera 111 may be a plurality of cameras, or may be a 360-degree full spherical camera capable of capturing a full spherical image by combining one or a plurality of cameras.

The virtual object generation processor 122 generates a virtual object that is an object in a virtual space different from the real space. For example, the virtual object generation processor 122 reads the template data of the virtual object stored in the memory 128, generates the virtual object data in accordance with the user operation using the input operation unit 121, displays it on the display unit 130, and stores it in the memory 128.

The template data of the virtual object is not always necessary, and the virtual object data may be directly generated by user operation without the template. For example, it is possible to generate a rectangular parallelepiped virtual object by designating eight points to be the vertices of the virtual object in the real space by the user operation using the input operation unit 121.

Here, in addition to the normal display shown in FIG. 4 to be described later in which virtual objects are displayed to be superimposed on the scenery in the real space, a batch display mode in which all virtual objects can be identified at one view in the visual field is provided.

Figure 19:
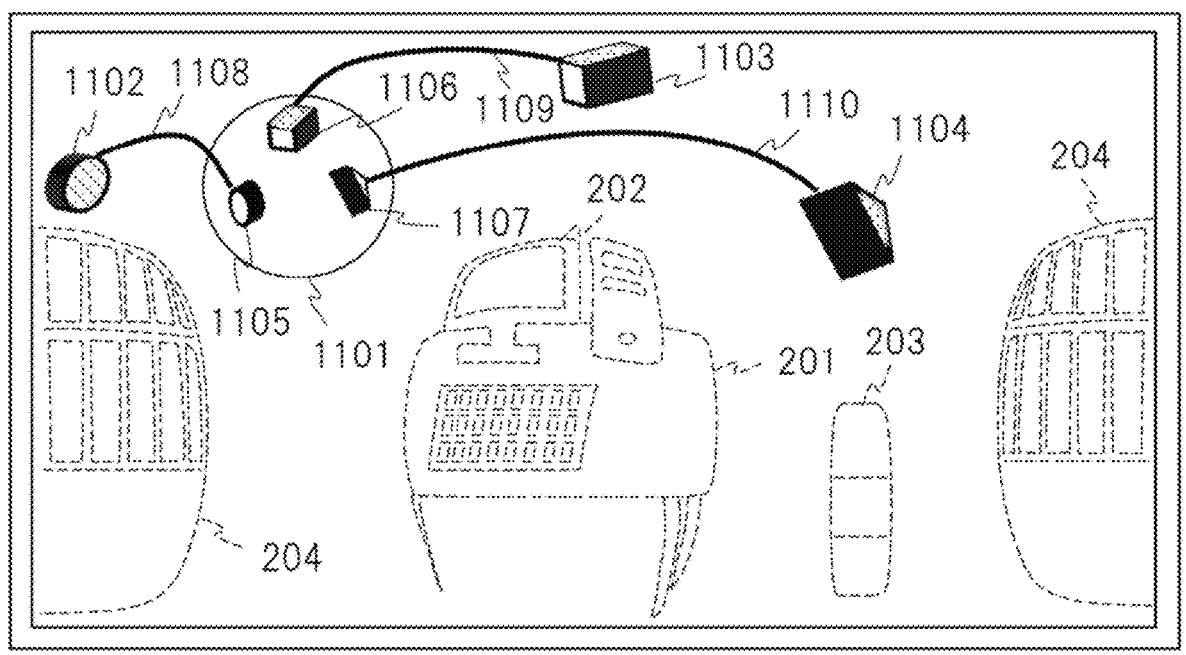
FIG. 19 is an explanatory diagram showing an example of a display screen in the case where a full spherical image by the head-mounted information processing apparatus in FIG. 1 is displayed as a background.

Further, this batch display mode is divided into an original mode and a modified mode. The original mode is the format in which the virtual objects can be visually recognized in the normal display as shown in FIG. 19 described later, and is the mode in which the virtual objects are displayed so as to be arranged in a display visual field. On the other hand, in the modified mode, the display format is adjusted such that the virtual objects can be easily identified in the batch display, apart from the display format in which the virtual objects can be visually recognized in the normal display.

The virtual object attitude operation processor 123 changes the attitude information of the virtual object at the time of the batch display, and operates the virtual object so as to have the attitude that can be easily visually recognized in the batch display (modified mode). The virtual object transformation operation processor 124 changes the attitude information such that the change in the attitude is reflected not only on the batch display (modified mode) but also on the display of the original virtual object (normal display).

The virtual object attitude operation processor 123 operates the attitude of the virtual object so as to have the attitude that can be easily visually recognized, by rotating, enlarging, and reducing the virtual object displayed on the display unit 130. The attitude operation result by the virtual object attitude operation processor 123 is valid only in the batch display (modified mode), and does not affect the attitude, shape, orientation, and the like of the original object.

The virtual object transformation operation processor 124 performs a transformation operation for the virtual object displayed on the display unit 130. This transformation operation is, for example, changing the orientation of the virtual object, changing the size of the virtual object, changing the shape of the virtual object, deleting part of the virtual object, or deleting the whole virtual object.

The result of the transformation operation is reflected on the display of the batch display (modified mode) and also on the attitude, shape, orientation, and the like of the original virtual object.

The controller 125 is composed of, for example, a CPU (Central Processing Unit) or the like. The controller 125 controls each functional block by executing a program 126 such as an OS (Operating System) or an operation control application, thereby controlling the operation of the overall head-mounted information processing apparatus 100.

In the controller 125, the control to arrange and display each virtual object generated by the virtual object generation processor 122 in the display visual field of the display unit 130 is performed in accordance with virtual object display instruction information input by the input operation unit 121 for instructing the display of the virtual object.

As this control example, a full spherical image showing an all-around scenery of the head-mounted information processing apparatus 100 is projected and reflected on the display visual field screen of the display unit 130, and the virtual object is arranged and displayed at the position on the full spherical image where the virtual object actually exists.

As another control example, a small object, for example, a transparent small sphere is arranged and displayed on the display visual field screen, and a miniature (small model) of a virtual object is arranged and displayed on the small object. As to the arrangement position of the miniature in the small object, the miniature is arranged at the position reflecting the actual existence position of the virtual object.

Further, when the virtual object that is hard to be visually recognized is present in the display visual field, the controller 125 controls the attitude of the virtual object by the virtual object attitude operation processor 123 such that the virtual object is displayed in the state where the entire shape of the virtual object is easily visually recognized. The controller 125 generates a display image by using also the input information from functional blocks such as the sensors and detectors connected by the bus 140.

The memory 128 is composed of a non-volatile semiconductor memory exemplified by a flash memory or the like, and stores various programs 126 described above, data 127 such as virtual objects and photographed images, and others.

The display unit 130 is composed of, for example, a liquid crystal panel. The display unit 130 displays the photographed image of the real space and the virtual object. In addition, the display unit 130 displays display contents such as the presentation notification information to the user and the operating state on the screen.

For example, when displaying the photographed image taken by the camera 111 and displaying the virtual object, the virtual object is arranged and displayed at the position where the virtual object exists on the full spherical image showing the all-around scenery of the head-mounted information processing apparatus 100. Alternatively, the small object in which the miniature of the virtual object is arranged is displayed.

The display unit 130 may be a semi-transparent display device, and in that case, the virtual object or the like may be displayed so as to be superimposed on the real space seen through the display device.

Here, the case where the display unit 130 is a semi-transparent type will be described, but when the display unit 130 is not a semi-transparent type, the virtual object or the like may be displayed so as to be superimposed on the image in the real space taken by the camera 111.

Example of Field of View of User

Figure 2:
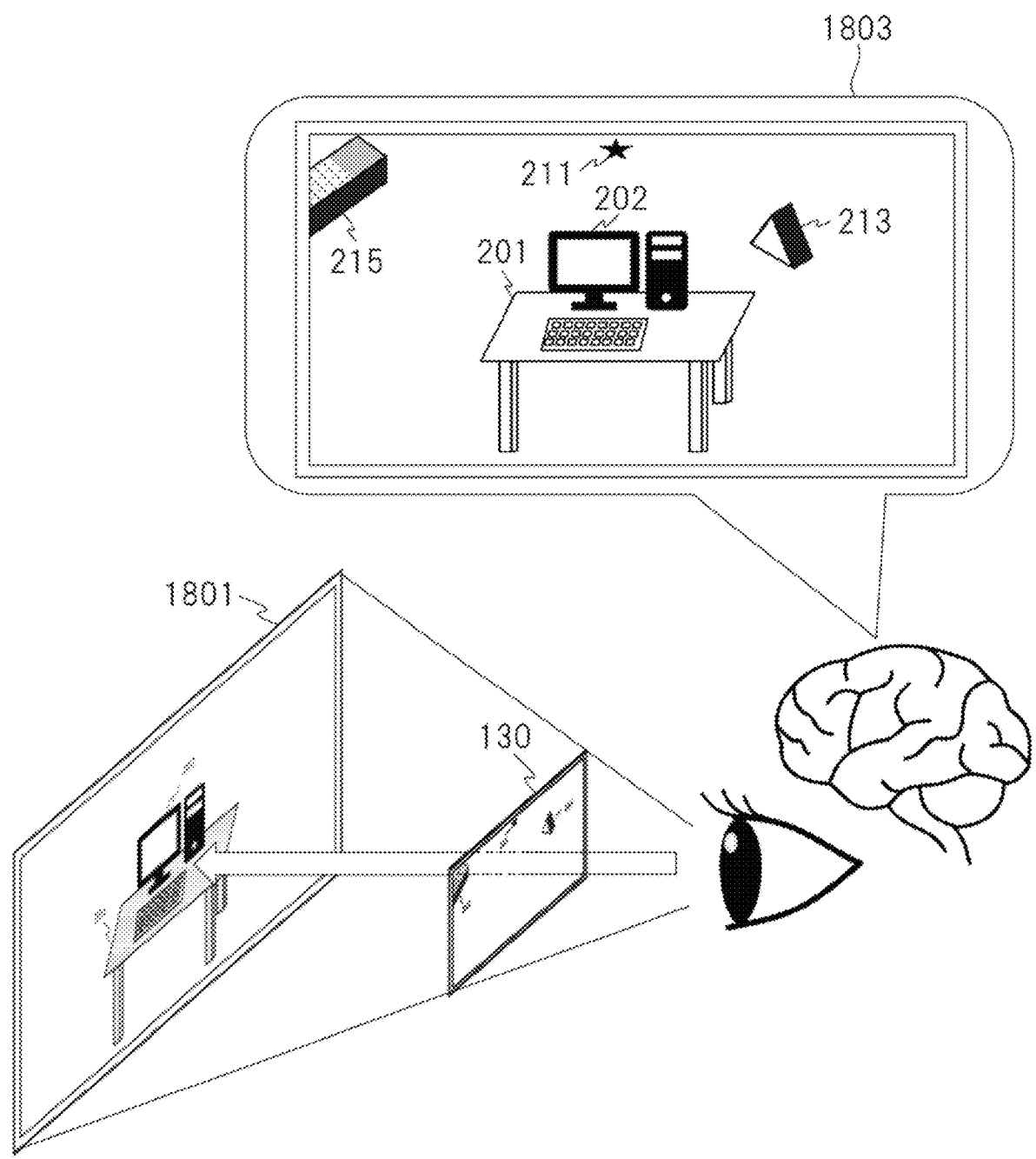
FIG. 2 is an explanatory diagram showing an example of a field of view of a user by the display unit in the head-mounted information processing apparatus in FIG. 1.

FIG. 2 is an explanatory diagram showing an example of a field of view of a user by the display unit 130 in the head-mounted information processing apparatus 100 in FIG. 1.

FIG. 2 shows an example in which the display unit 130 is a semi-transparent type as described above, and only the virtual object created by reading the virtual object data stored in the memory 128 by the controller 125 is displayed on the display unit 130. There is nothing displayed in the other parts, and a scenery 1801 in the real space ahead of the display unit 130 can be seen through the display unit 130.

By seeing the scenery 1801 in the real space through the display unit 130, the user can see as if the virtual objects exist on the scenery in the real space, as in a scenery 1803 shown in the upper part of FIG. 2.

In FIG. 2, the right-eye gaze detector 112 and the left-eye gaze detector 113 detect the gazes of the right eye and the left eye, respectively. A well-known technology generally used as an eye tracking process can be used as the process of detecting the gaze.

For example, in the method using corneal reflex, the technology in which the user's face is irradiated with an infrared LED (Light Emitting Diode) and captured by an infrared camera or the like, the position of the reflected light on the cornea obtained by the irradiation of the infrared LED, that is, the corneal reflex is set as a reference, and the gaze is detected based on the position of the pupil with respect to the position of the corneal reflex has been known.

The acceleration sensor 114 is a sensor configured to detect the acceleration which is the change in speed per unit time, and can grasp the motion, vibration, impact, and the like. The gyro sensor 115 is a sensor configured to detect the angular velocity in the rotation direction, and can grasp the state of the vertical, horizontal, and diagonal attitudes.

By using the acceleration sensor 114 and the gyro sensor 115, it is possible to detect the motion of the head of the user equipped with the head-mounted information processing apparatus 100.

The geomagnetic sensor 116 is a sensor configured to detect the magnetic force of the earth, and it detects the direction in which the head-mounted information processing apparatus 100 is facing. The geomagnetic sensor 116 can grasp the geomagnetic change with respect to the motion of the head by using, for example, a three-axis type that detects the geomagnetism in the vertical direction in addition to the front-back direction and the left-right direction. By this means, it is also possible to detect the motion of the head.

The acceleration sensor 114, the gyro sensor 115, and the geomagnetic sensor 116 make it possible to detect the motion and fluctuation of the head-mounted information processing apparatus 100 worn by the user in detail.

The vibration generator 117 is configured to generate vibrations under the control of the controller 125, and it converts the notification information to the user issued from the head-mounted information processing apparatus 100 into vibration. The vibration generator 117 can reliably transmit the notification to the user by, for example, generating vibrations to the head of the user to which the head-mounted information processing apparatus 100 is tightly attached.

The ambient sound microphone 118 and the voice microphone 119 collect the sound from the outside and the user's own voice. The headphones 120 are worn on the user's ears and used to listen to the sound to the user, and can notify the user of the notification information by sound.

The voice microphone 119 may be an audio input device such as a bone conduction microphone. The headphones 120 may be an audio output device such as a speaker or bone conduction earphones.

The depth sensor 131 measures the distance to the object by the plane. As the depth sensor 131, for example, the sensor utilizing reflections of infrared ray or laser can be used, but it may be realized by other methods such as obtaining distance information from the parallax of images taken by multiple cameras installed at different positions.

The controller 125 analyzes the distance information acquired by the depth sensor 131, whereby it is possible to detect the motion of the hand, the motion of the body, and the like. The information obtained from the images taken by the camera 111 may be used together for the analysis of the motion of the hand and the motion of the body.

The stimulus generator 132 is configured to generate a stimulus that can be perceived by the skin, under the control of the controller 125, and it converts the notification information to the user issued from the head-mounted information processing apparatus 100 into a stimulus that can be perceived by the skin.

Examples of the stimulus that can be perceived by the skin include pressure, warmth, coldness, and electrical stimulus. The stimulus generator 132 can reliably transmit the notification to the user by generating the stimulus that can be perceived by the skin of the user's head to which the head-mounted information processing apparatus 100 is tightly attached.

The input operation unit 121 is composed of, for example, a keyboard, key buttons, or a touch pad, and it sets and inputs information that the user wants to input. The input operation unit 121 may be provided at a position where the user of the head-mounted information processing apparatus 100 can easily perform the input operation. Alternatively, it may be separated from the main body of the head-mounted information processing apparatus 100 and connected by wire or wirelessly.

Examples of the input operation unit separated from the head-mounted display include a space mouse, which is a three-dimensional spatial position input device using a gyro sensor and an acceleration sensor, and a controller configured to detect a spatial position of the controller itself worn on the body from the camera image showing the body and use the spatial position for input.

Further, it is also possible to take the input operation information by displaying the input operation screen on the display screen of the display unit 130 and detecting the position on the input operation screen to which the gaze detected by the right-eye gaze detector 112 and the left-eye gaze detector 113 is directed. Alternatively, it is possible to take the input operation information by displaying the pointer on the input operation screen and operating the pointer by the input operation unit 121.

It is also possible to take the input operation information by moving the pointer in accordance with the motion of the user's head detected by each sensor including the camera 111, that is, the acceleration sensor 114, the gyro sensor 115, the geomagnetic sensor 116, and the depth sensor 131.

Further, it is possible to take the input operation information by collecting the user's voice indicating the input operation with the voice microphone 119. It is also possible to take the input operation information by capturing the motion of the user's hand or the motion of the user's body obtained by the image of the camera 111, the depth sensor, or the like and analyzing it as gesture input by the controller 125.

By using vocalization, display, and body motion for the input operation, the usability of the head-mounted information processing apparatus 100 worn on the head can be further improved.

With the above configuration, all virtual objects can be arranged and displayed in a batch within the display visual field of the display unit 130 in accordance with the virtual object display request instruction for instructing the display of virtual objects input by the input operation unit or the like. As a result, the existence of all virtual objects can be easily visually recognized.

Furthermore, for the virtual object whose shape and arrangement state are unclear, the attitude of the virtual object is operated by rotating, enlarging, and reducing it, whereby the effect of being able to accurately visually recognize the shape and the overall picture of the virtual object and identify the virtual object conveniently can be obtained.

Operation Example of Head-Mounted Information Processing Apparatus

Next, the operation of the head-mounted information processing apparatus 100 in FIG. 1 will be described.

Figure 3:
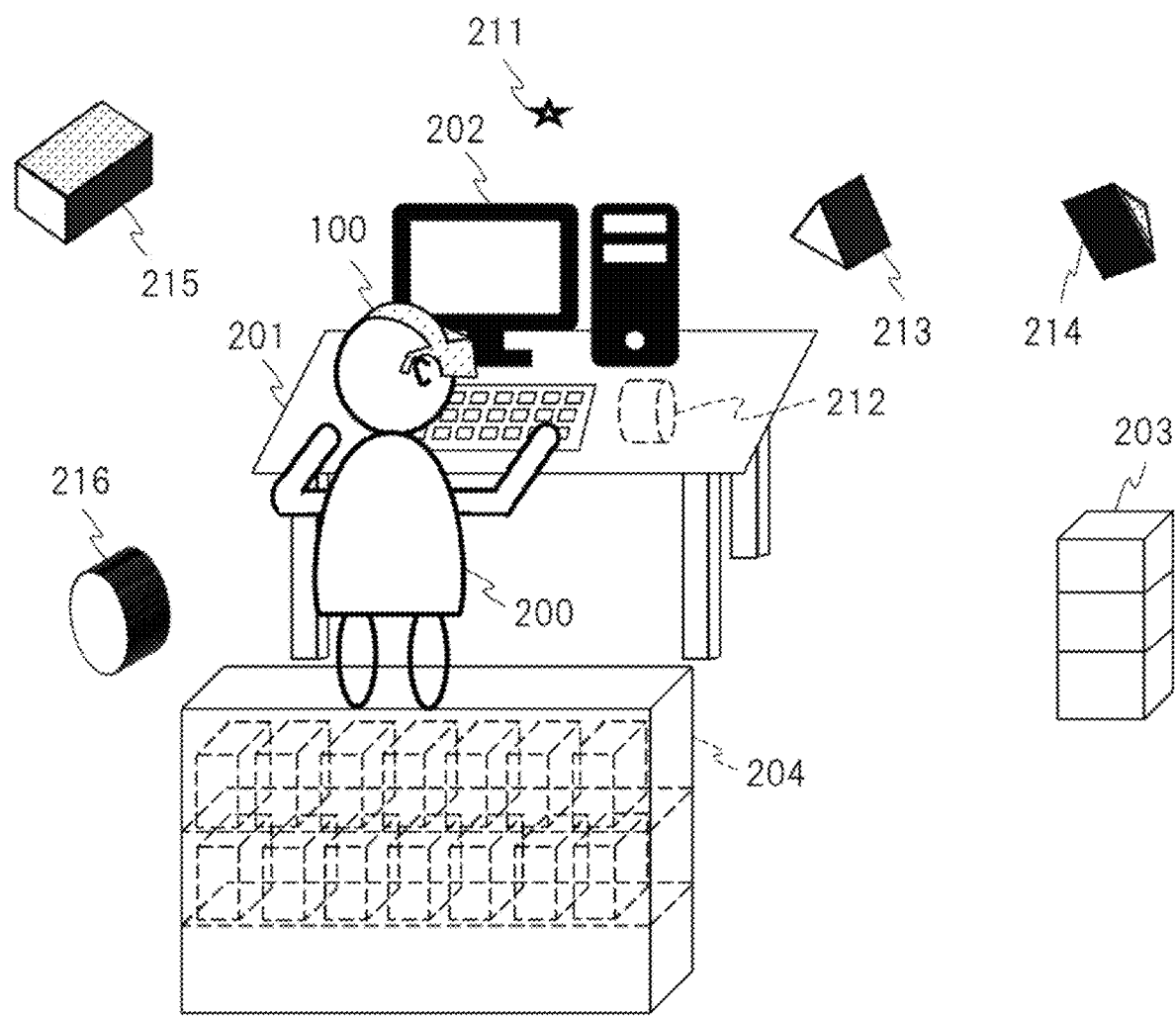
FIG. 3 is an explanatory diagram schematically showing an example of a full view of the surroundings in a usage situation of the head-mounted information processing apparatus in FIG. 1.

FIG. 3 is an explanatory diagram schematically showing an example of a full view of the surroundings in a usage situation of the head-mounted information processing apparatus 100 in FIG. 1.

In FIG. 3, a desk 201 and a personal computer 202 are placed in front of a user 200 wearing the head-mounted information processing apparatus 100. Also, a storage box 203 is placed on the right side of the user 200, and a bookshelf 204 is placed at the back of the user 200.

As the virtual objects generated by the virtual object generation processor 122, a virtual object 211 is arranged on the far side of the front, a virtual object 212 is arranged behind the desk 201, a virtual object 213 is arranged on the right side beyond the desk 201, a virtual object 214 is arranged on the far side beyond the storage box 203, a virtual object 215 is arranged on the left side beyond the desk 201, and a virtual object 216 is arranged on the right side beyond the bookshelf 204.

Figure 4:
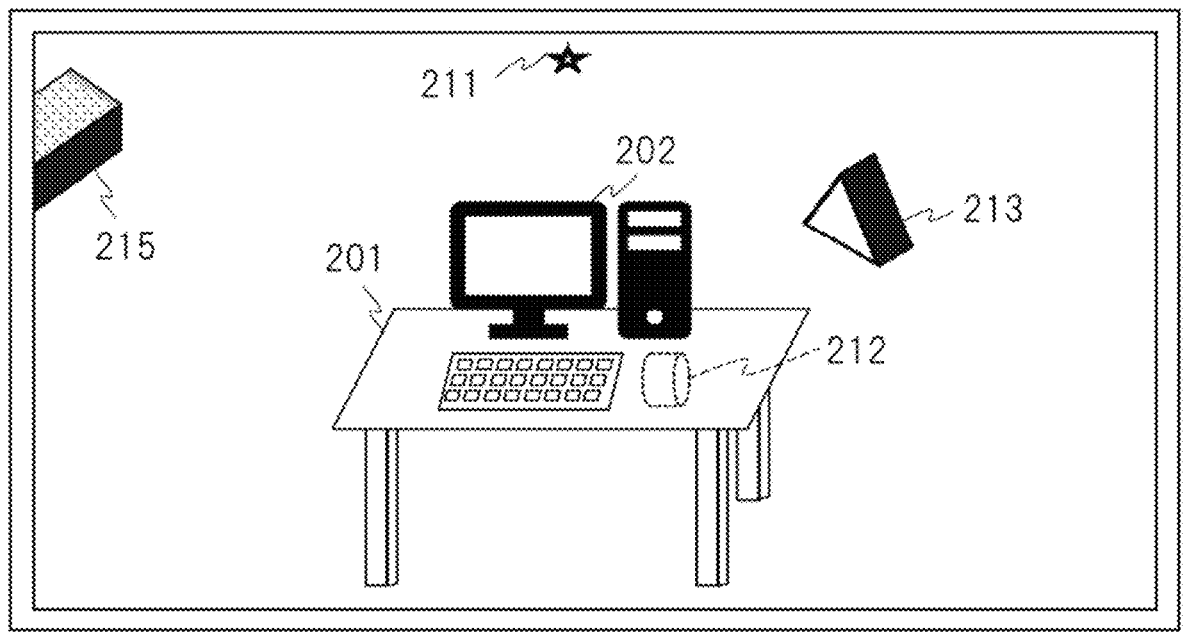
FIG. 4 is an explanatory diagram showing an example of a real scenery in the example of the full view shown in FIG. 3.
Figure 4:
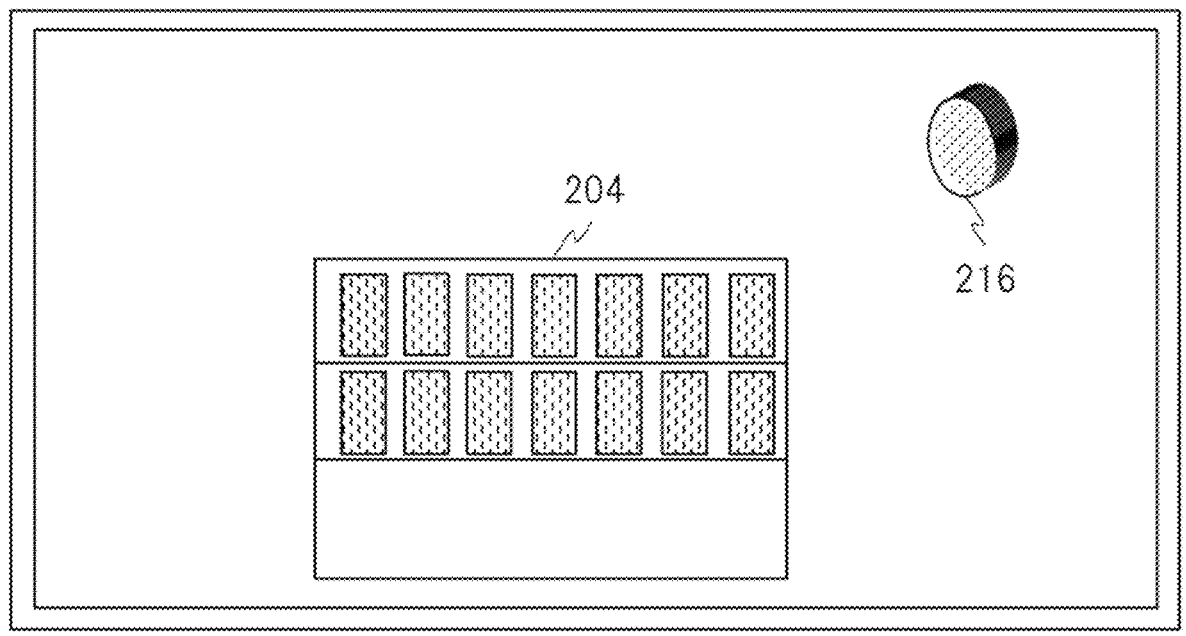

FIG. 4 is an explanatory diagram showing an example of a real scenery in the example of the full view shown in FIG. 3.

FIG. 4(a) shows a photographed scenery when a user wearing the head-mounted information processing apparatus 100 looks forward, that is, the field of view of the user wearing the head-mounted information processing apparatus 100 in the full view of the surroundings shown in FIG. 3.

The virtual objects 211 and 213 placed at coordinate positions within the current visual field of the user are displayed, but the virtual objects 214 and 216 placed at coordinate positions outside the visual field are not displayed.

The virtual object 215 partially arranged at the coordinate position within the visual field is only partially displayed, and the virtual object 212 behind the desk 201 is not displayed.

FIG. 4(b) shows a photographed scenery when the user wearing the head-mounted information processing apparatus 100 looks backward, that is, the field of view of the user wearing the head-mounted information processing apparatus 100 when the user faces backward in the full view of the surroundings shown in FIG. 3.

As shown in FIG. 4(b), in the state where the user wearing the head-mounted information processing apparatus 100 faces backward, the virtual object 216 arranged at the coordinate position within the visual field is displayed, but the virtual objects other than the virtual object 216 are not displayed because they are placed at coordinate positions outside the visual field.

As described above, the virtual object arranged at the coordinate position outside the visual field corresponding to the orientation of the head of the user wearing the head-mounted information processing apparatus 100 is not displayed.

Figure 5:
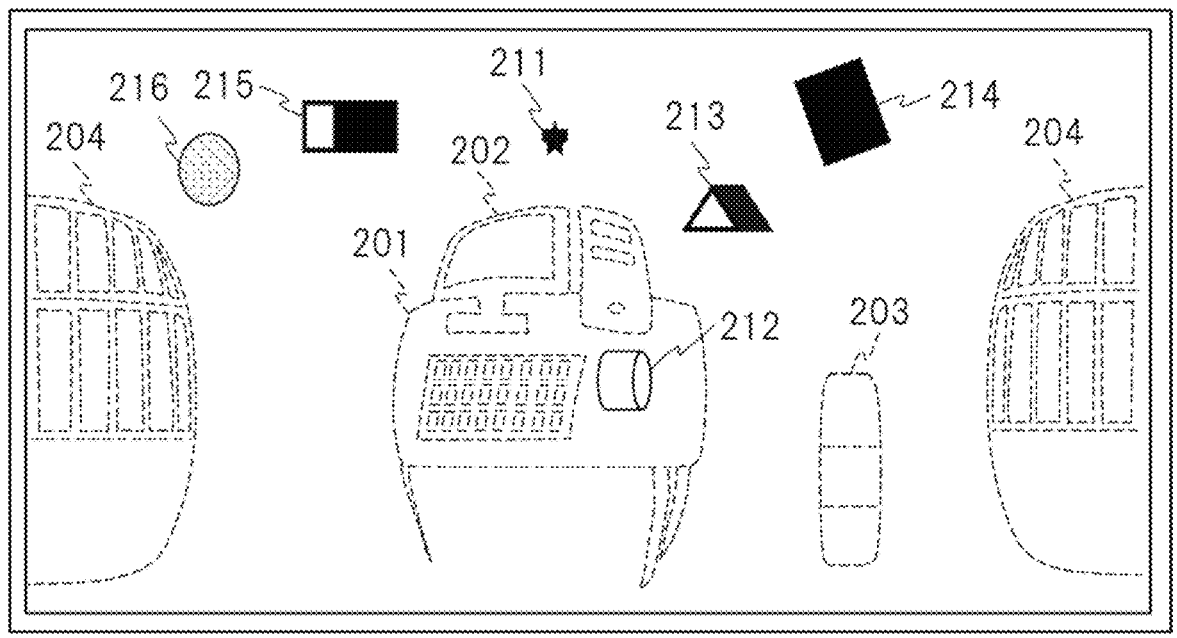
FIG. 5 is an explanatory diagram showing an example of a display screen in the head-mounted information processing apparatus in FIG. 1.

FIG. 5 is an explanatory diagram showing an example of a display screen in the head-mounted information processing apparatus 100 in FIG. 1. FIG. 5 shows an example of the display screen in which virtual objects by the head-mounted information processing apparatus 100 are arranged and displayed in a batch within the display visual field screen.

The portions shown by the dotted lines in FIG. 5 indicate the examples of photographed objects displayed as a background. These are shown for making the positional relationship with the virtual objects easily understood, and are not necessarily displayed. Hereinafter, also in FIG. 8 to FIG. 11, it is not always necessary to display the portions shown by the dotted lines as in FIG. 5.

In this case, as shown in FIG. 5, the head-mounted information processing apparatus 100 projects and reflects a full spherical image showing the all-around scenery of the head-mounted information processing apparatus 100 on the display visual field screen of the display unit 130, and displays the virtual objects in a batch by arranging the virtual objects at the positions where the virtual objects exist on the projected and reflected full spherical image.

In this way, it is possible to visually recognize the existence of even a virtual object such as the virtual object 212 arranged behind a real object such as the desk 201. As a result, the existence of all virtual objects existing in the full view of the surroundings can be visually recognized together with the existence positions.

Figure 6:
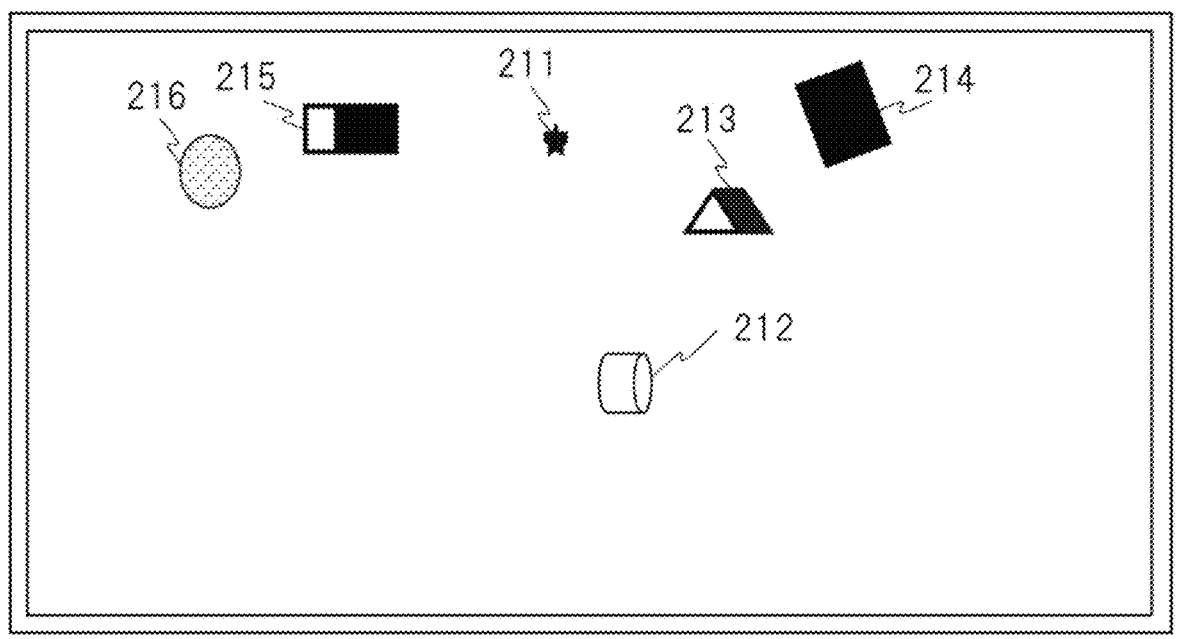
FIG. 6 is an explanatory diagram showing a display example in the case where dotted-line portions in FIG. 5 are not displayed.
Figure 7:
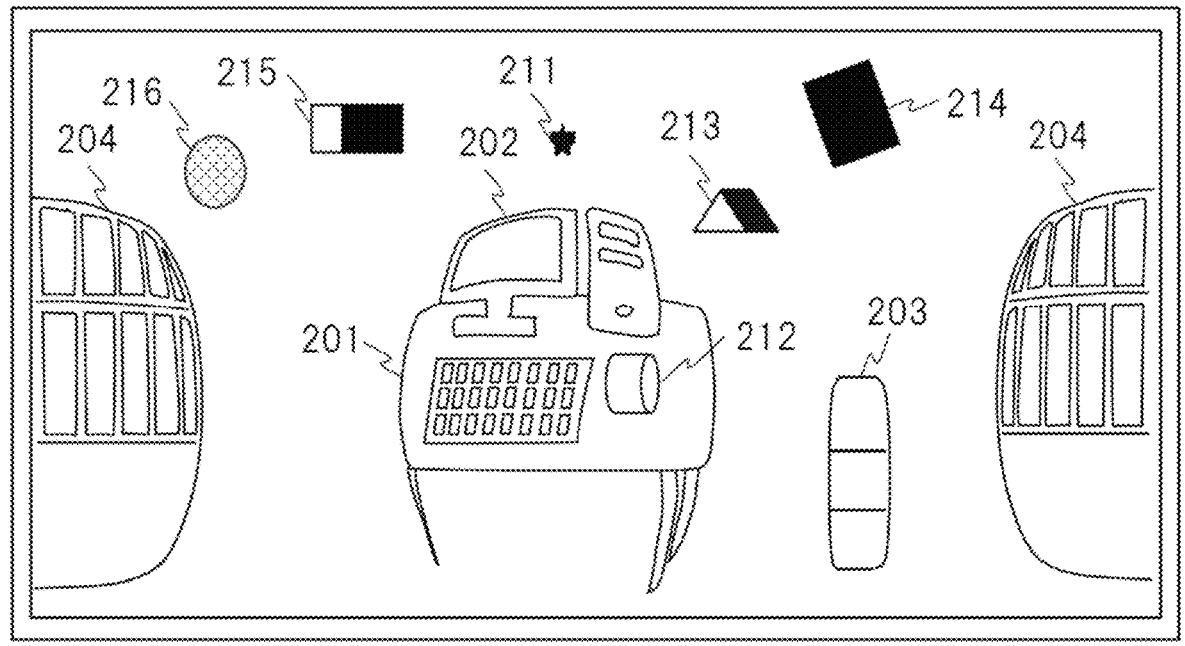
FIG. 7 is an explanatory diagram showing a display example of background images of photographed objects in the head-mounted information processing apparatus in FIG. 1.

FIG. 6 is an explanatory diagram showing a display example in the case where dotted-line portions in FIG. 5 are not displayed. FIG. 7 is an explanatory diagram showing a display example of background images of photographed objects in the head-mounted information processing apparatus 100 in FIG. 1.

In FIG. 5, the background images of the photographed objects are shown by dotted lines in order to make the positional relationship with the virtual objects easily understood, but in the actual display, the dotted lines are not displayed as shown in FIG. 6.

Alternatively, when displaying all the virtual objects existing in the all-around scenery, the controller 125 may display the photographed objects such as the desk 201, the personal computer 202, the storage box 203, and the bookshelf 204 shown by the dotted lines in FIG. 5, as shown in FIG. 7.

In this way, it is possible to easily recognize the positional relationship between the real space and the virtual objects. For example, when there is the virtual object 216 on the upper right side of the bookshelf 204 on the back side as shown in FIG. 5, the position of the virtual object can be easily recognized if the virtual object is displayed at the upper right position of the bookshelf as the background image.

Note that the full spherical image showing the all-around scenery of the head-mounted information processing apparatus 100 may be acquired by using a 360-degree full spherical camera capable of capturing a full spherical image at one time, or may be acquired by stitching the images from the camera with a normal angle of view.

Further, it is also possible to use only part of the acquired image, and it is obvious that the same function and effect can be obtained also in the case where the existence of almost all of the virtual objects can be visually recognized in the image of the partial range such as the 180-degree spherical image, other than the full spherical image.

Figure 8:
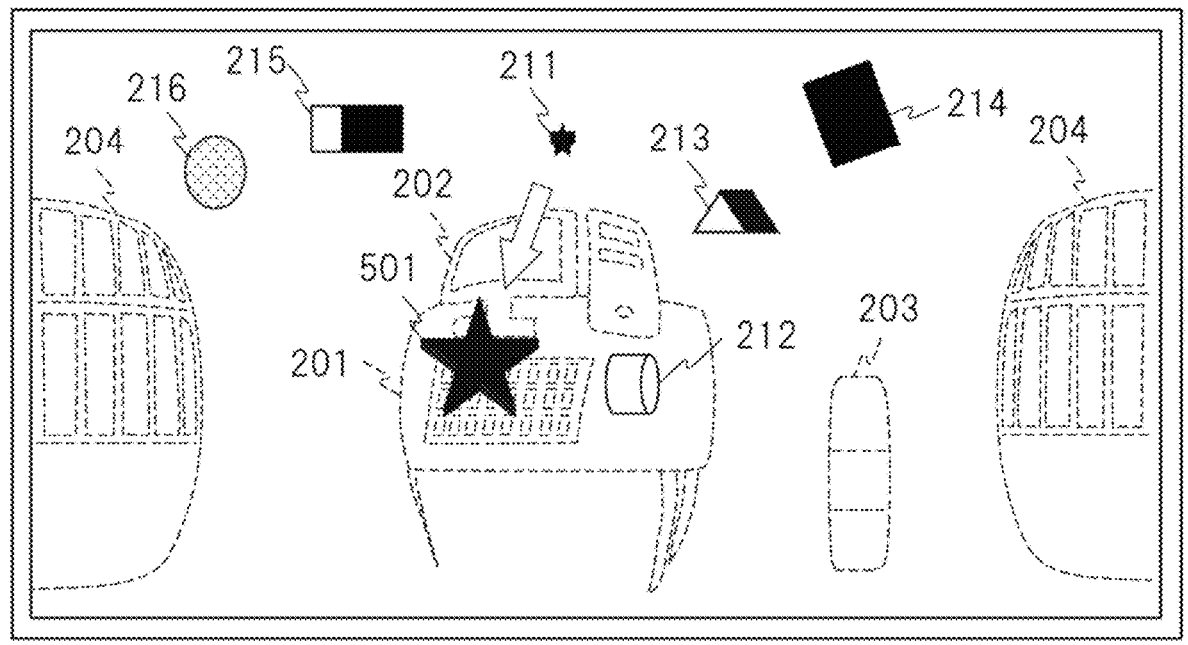
FIG. 8 is an explanatory diagram showing another example of the display screen in the head-mounted information processing apparatus in FIG. 1.

FIG. 8 is an explanatory diagram showing another example of the display screen in the head-mounted information processing apparatus 100 in FIG. 1. The example in FIG. 8 shows the display screen in the case where a virtual object selected from the virtual objects in the batch display in FIG. 5 is displayed at a predetermined position on the near side.

In this case, for example, the user selects the virtual object 211 from the virtual objects in the batch display shown in FIG. 5. Then, the user performs an operation of enlarging and arranging the selected virtual object at a predetermined position while leaving the batch display of the virtual objects in the background in the display visual field of the display unit 130, thereby displaying it like the virtual object 501 of FIG. 8.

The operation of enlarging and arranging the virtual object at the predetermined position may be performed automatically by selecting the object, or may be performed manually by a natural operation such as pulling the selected object. Further, the operation to change the enlargement factor of the object determined at the time when it is arranged may be performed.

The above operation is mainly executed by the controller 125. The controller 125 reads the data 127 such as the shape and display position of the object stored in the memory 128 in accordance with the user operation input from the input operation unit 121, and displays the object on the display unit 130 after changing the information of the shape and display position of the selected object.

In this way, the virtual object that is difficult to see in the batch display can be visually recognized more clearly. As the predetermined position, the initial value stored in advance in the memory 128 may be used. The initial value is, for example, a position where the object can be easily visually recognized.

Alternatively, the controller 125 may use the setting information written from the input operation unit 121 to the memory 128 and set each time by the user. In this case, if the setting information is defined as, for example, a moving range portion of the hand in front of the body, it is easy to visually recognize the virtual object, and it is easy to perform the attitude operation or the transformation operation.

After visually confirming the selected virtual object, the selected virtual object is returned to the original position before the arrangement operation, in the background in the display visual field of the display unit 130. This operation is automatically performed by the controller 125 after the end of the visual confirmation.

In the case where the operation of selecting another virtual object and arranging it to a predetermined position is continuously performed, the previously selected virtual object returns to its original position, and the original batch display image of the virtual objects remains as background. Therefore, the next arrangement operation and visual confirmation of the virtual object can be easily performed.

On the other hand, in the case where one virtual object is selected and the arrangement operation thereof is performed and then the arrangement operation of another virtual object is not performed, the batch display screen of the virtual objects may be erased and returned to the display visual field screen in which the virtual object is displayed to be superimposed at the original existence position, when the virtual object is returned to the original position after the end of the visual recognition operation by the arrangement operation.

In addition, in the case where the batch display of the virtual objects becomes an obstacle at the time of the arrangement operation to arrange the virtual object at a predetermined position, the batch display image of the virtual objects in the background portion may be deleted.

Alternatively, the virtual object may be displayed to be superimposed at the original existence position on the photographed image of the real space captured in advance by the camera 111 and displayed on the display unit 130. For example, the usability can be improved when it is used in the case where it is desired to arrange the virtual object according to the dimensions of the background in the real world.

Example of Attitude Operation of Virtual Object

Next, the attitude operation of the virtual object by the head-mounted information processing apparatus of FIG. 1 will be described.

Figure 9:
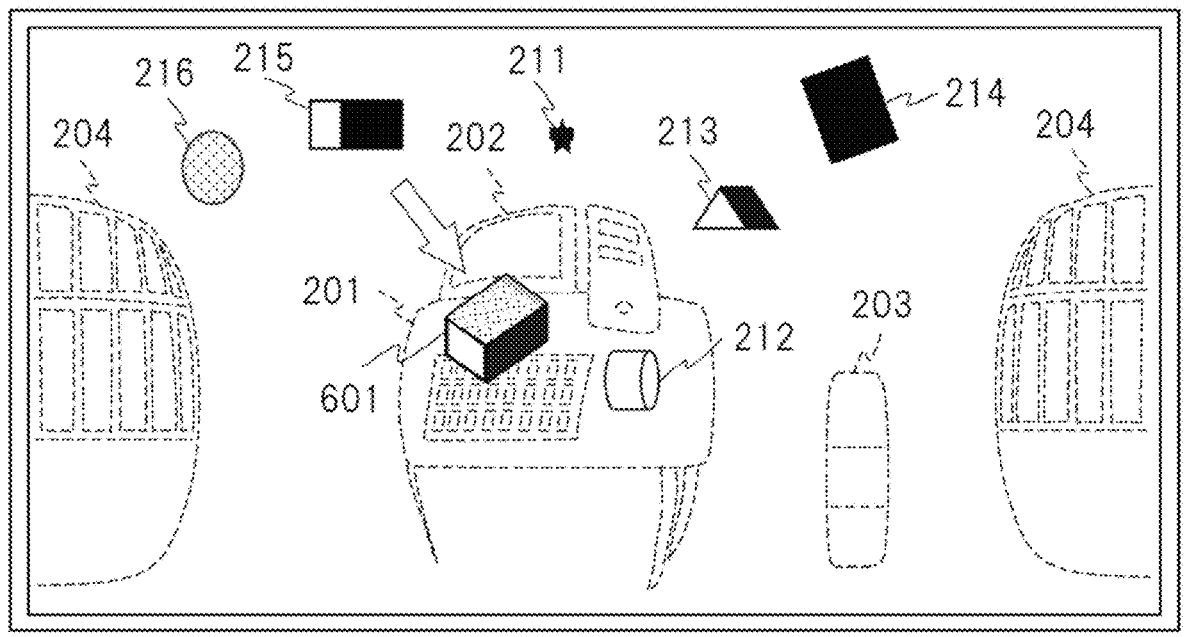
FIG. 9 is an explanatory diagram showing an example of a display screen in an attitude operation of a virtual object by the head-mounted information processing apparatus in FIG. 1.
Figure 10:
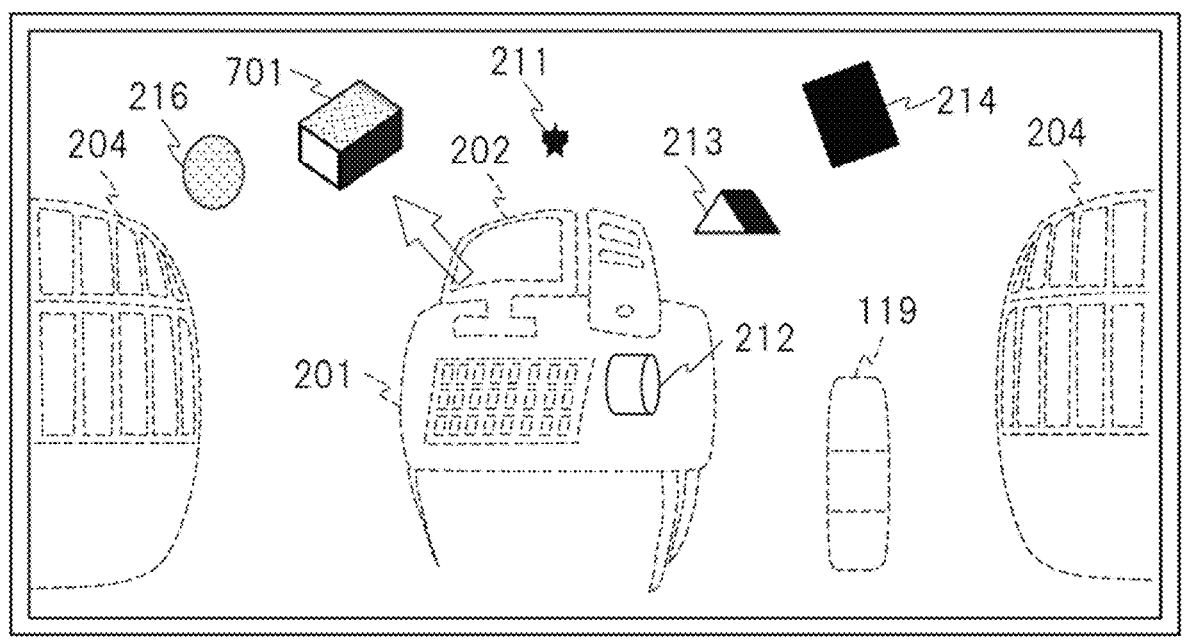
FIG. 10 is an explanatory diagram showing an example of the display of the virtual object after the attitude operation continued from FIG. 9.
Figure 11:
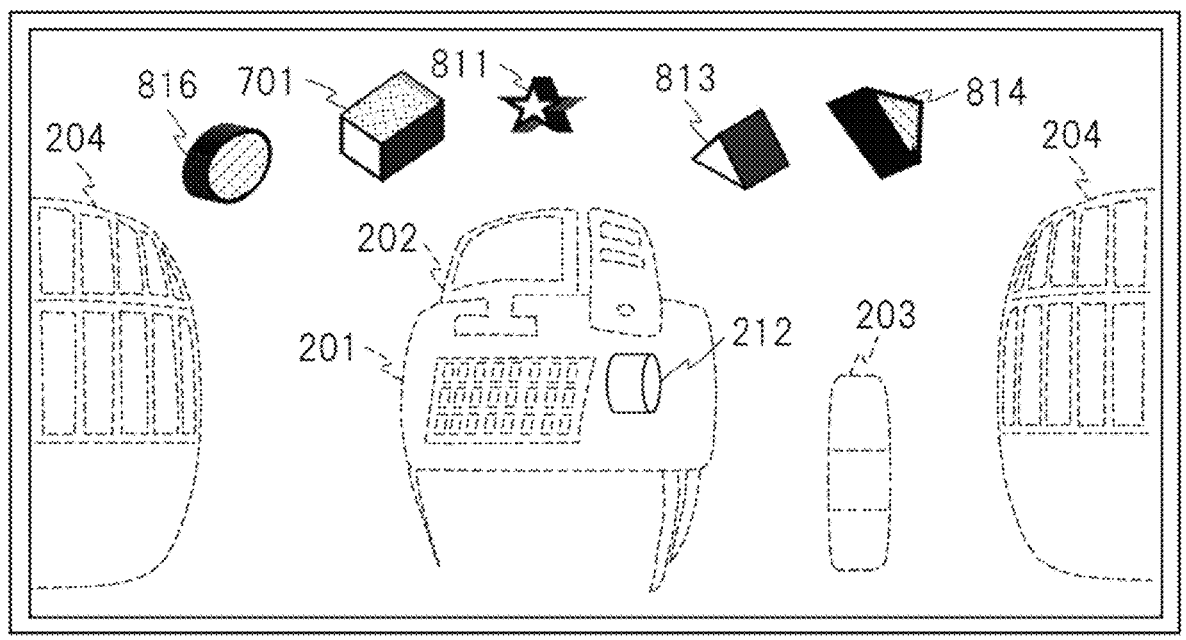
FIG. 11 is an explanatory diagram showing another example of the display of the virtual object after the attitude operation continued from FIG. 9.

FIG. 9 is an explanatory diagram showing an example of a display screen in an attitude operation of a virtual object by the head-mounted information processing apparatus 100 in FIG. 1. FIG. 10 is an explanatory diagram showing an example of the display of the virtual object after the attitude operation continued from FIG. 9. FIG. 11 is an explanatory diagram showing another example of the display of the virtual object after the attitude operation continued from FIG. 9.

In FIG. 9 to FIG. 11, the portions shown in FIG. 3 and denoted with the same reference characters have the same operations as those already described in FIG. 3, and therefore detailed description thereof will be omitted.

As described with reference to FIG. 5, the existence of all virtual objects can be visually recognized by arranging and displaying the virtual objects on the full spherical image, but it is sometimes difficult to visually recognize the entire shape of the virtual object as it is.

Therefore, for a virtual object that is arranged in the display visual field and is not easily virtually recognized, the attitude of the virtual object is operated by virtual object attitude operation processor 123 such that the entire shape of the virtual object can be easily visually recognized, and the virtual object after the attitude operation is returned and displayed at the original position on the batch display (modified mode).

In the above operation, the virtual object attitude operation processor 123 reads the data 127 such as the shape and display position of the object stored in the memory 128, and writes the information in the memory 128 after changing the shape and display position of the selected object. The controller 125 displays the information read from the memory 128 on the display unit 130.

For example, the virtual object 215 shown in FIG. 9 originally has a cubic shape, but the display shape thereof cannot be visually identified as a cube in the display shape on the full spherical image. Therefore, the virtual object attitude operation processor 123 first moves the virtual object 215 to a predetermined display position on the near side where the attitude operation can be easily performed, while enlarging the virtual object 215 as necessary.

Thereafter, the virtual object attitude operation processor 123 rotates the moved virtual object 215 with the inclusion of a three-dimensional rotation operation and performs the attitude operation such that the virtual object 215 has the display shape whose entire shape can be easily visually recognized, thereby transforming it into the display shape indicated by a virtual object 601.

As to the display shape whose entire shape can be easily visually recognized, information (attitude information) such as the orientation, size, and color of the object with which the object can be easily visually recognized is stored in advance in the memory 128 so as to be associated with the shape data to be a template when the virtual object is created, and the information may be used for the generated virtual object. Also, the attitude information specified by the user for each virtual object and stored in the memory 128 may be used at the time of display.

Further, after the attitude operation by the virtual object attitude operation processor 123, the virtual object may be returned to the original position on the batch display (modified mode) and displayed as a virtual object 701 as shown in FIG. 10.

FIG. 11 shows the display shape of the virtual object in the case where the attitude operation has been performed for the virtual objects other than the virtual object 215. The virtual object attitude operation processor 123 performs the attitude operation by rotation for the virtual objects 213, 214, and 216 shown in FIG. 9 in the same manner as that for the virtual object 215. By this means, the virtual objects 213, 214, and 216 are transformed into display shapes shown by virtual objects 813, 814, and 816 in FIG. 11, respectively.

Further, the attitude operation by enlargement is performed for the virtual object 211 in FIG. 9. In this way, the virtual object 211 is transformed into the display shape of a virtual object 811 in FIG. 11. As a result, it is possible to display the virtual object having the display shape that can be easily visually identified.

As described above, the virtual object attitude operation processor 123 performs the attitude operation for the virtual object whose entire shape is difficult to be visually recognized, thereby transforming it into the virtual object having the display shape whose entire shape can be easily visually identified. As a result, it becomes possible to accurately grasp the entire shape and the overall picture of the virtual object.

In addition, when attitude information as to the shape that can be easily visually recognized is set in advance for the virtual object, instead of performing the attitude operation after moving the virtual object to the predetermined position, the virtual object after the attitude operation automatically performed by the virtual object attitude operation processor 123 based on the set attitude information may be displayed, at the time of the start of the batch display (modified mode) by the controller 125.

Also, the entire space of the virtual objects may be rotated without changing the mutual arrangement and positional relationship of the virtual objects such that the selected virtual object comes to the front. Namely, instead of rotating the body of the user toward the virtual object, the entire space of the virtual objects is rotated.

Example of Transformation Operation

Next, the transformation operation will be described.

The virtual object transformation operation processor 124 can perform the transformation operation in the state where the virtual object 215 is moved to a predetermined position on the near side, for example, the position of the virtual object 601 as shown in FIG. 9.

In this case, in the transformation operation, the virtual object transformation operation processor 124 changes the information of the shape and display position of the selected object and writes the information to the memory 128. Here, the shape of the virtual object includes orientation, size, angle, and the like. The controller 125 displays the virtual object 601 on the display unit 130 based on the information stored in the memory 128.

The result of the transformation operation is reflected also on the display state of the original virtual object. For example, when the orientation of the object is changed by the transformation operation, not only the display for the batch display (modified mode) but also the orientation of the virtual object itself is changed. Therefore, even when making transition to the normal display in which the virtual objects are displayed to be superimposed on the scenery in the real space shown in FIG. 4(a) and FIG. 4(b), the virtual object is displayed with the orientation after the transformation operation. During the transformation operation, the shape including the orientation, size, and others of the original virtual object before the transformation may be kept displayed in a semi-transparent manner, or may be displayed in a place not used for the transformation operation within the visual field.

In this way, the difference in the shape including the orientation, size, and others between the original virtual object before the transformation and the virtual object after the transformation can be displayed in an easy-to-understand manner.

As to which of the attitude operation or the transformation operation is to be performed for the virtual object, the operation to be performed is specified before the operation by, for example, an operation mode switching button (not shown) provided on the input operation unit 121.

By using the attitude operation and the transformation operation in combination, the transformation operation may be performed after the virtual object is made easier to see by enlarging it by the attitude operation. Operations such as enlargement and reduction applied to the virtual object by the attitude operation may be applied to the transformation operation.

Display Example after Attitude Operation

Next, a display example of the virtual object after the attitude operation will be described.

Figure 12:
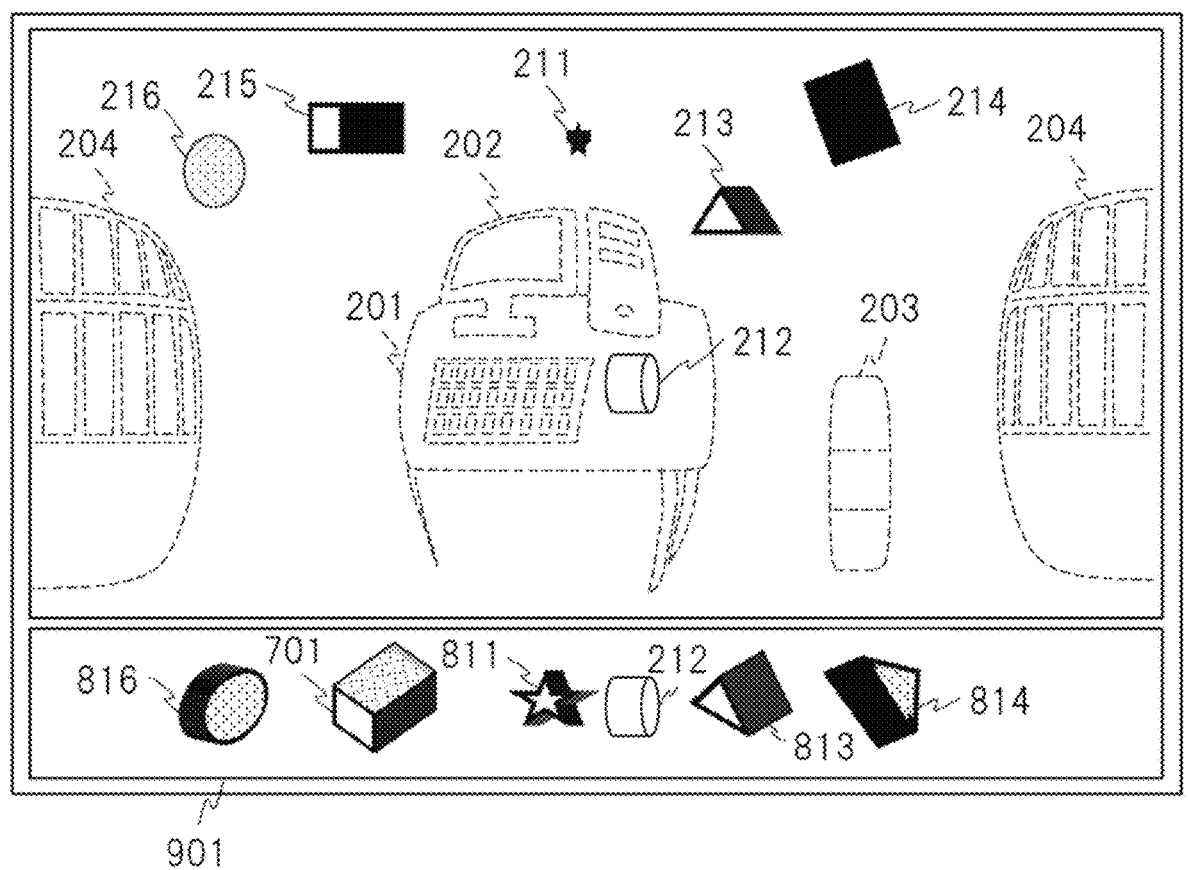
FIG. 12 is an explanatory diagram showing an example in which virtual objects after the attitude operation by the head-mounted information processing apparatus in FIG. 1 are displayed outside a frame of a full spherical display screen.
Figure 13:
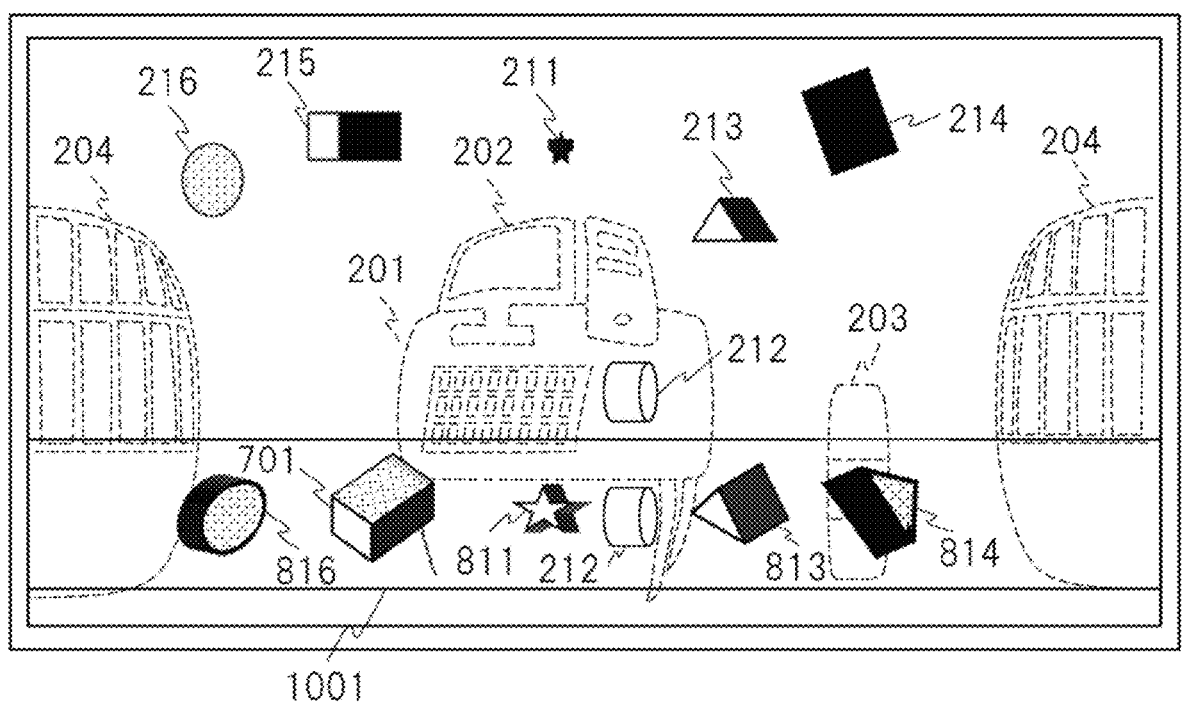
FIG. 13 is an explanatory diagram showing an example in which virtual objects after the attitude operation by the head-mounted information processing apparatus in FIG. 1 are displayed to be superimposed inside the full spherical display screen.

FIG. 12 is an explanatory diagram showing an example in which virtual objects after the attitude operation by the head-mounted information processing apparatus 100 in FIG. 1 are displayed outside a frame of the full spherical display screen. FIG. 13 is an explanatory diagram showing an example in which virtual objects after the attitude operation by the head-mounted information processing apparatus 100 in FIG. 1 are displayed to be superimposed inside the full spherical display screen.

In FIG. 12 and FIG. 13, the portions shown in FIG. 3 and denoted with the same reference characters have the same operations as those already described in FIG. 3, and therefore detailed description thereof will be omitted.

First, as shown in FIG. 12, the virtual objects 211 to 216 before the attitude operation are each displayed at their existence positions on the full spherical screen, and in addition, the virtual objects 212, 701, 811, 813, 814, and 816 after the attitude operation are displayed in a list in a lower area 901 outside the frame of the full spherical screen.

Also, the arrangement positions of the respective virtual objects 212, 701, 811, 813, 814, and 816 after the attitude operation in the area 901 are located in alignment with the existence positions of the virtual objects 211 to 216 before the attitude operation on the full spherical screen, in the vertical direction of the screen.

In the above operation, the virtual object attitude operation processor 123 reads the data 127 such as the shape and display position of the object stored in the memory 128, and writes the information in the memory 128 after changing the shape and display position of the selected object. Thereafter, the controller 125 displays the virtual object on the display unit 130 after adjusting the display position, size, and others of the virtual object based on the information read from the memory 128.

Alternatively, as shown in FIG. 13, the virtual objects 211 to 216 before the attitude operation may be displayed at their existence positions on the full spherical screen, and the virtual objects 212, 701, 811, 813, 814, and 816 after the attitude operation may be displayed in a list in an area 1001 provided on the lower side of the full spherical screen so as to be transparent on the full spherical screen.

Also, the positions of the virtual objects 211 to 216 before the attitude operation are aligned so as to correspond to the arrangement positions of the virtual objects 212, 701, 811, 813, 814, and 816 after the attitude operation in the area 1001 in the vertical direction of the display screen, respectively.

In the above operation, the virtual object attitude operation processor 123 reads the data 127 such as the shape and display position of the object stored in the memory 128, and writes the information in the memory after changing the shape and display position of the selected object.

Thereafter, the controller 125 displays the virtual object on the display unit 130 after adjusting the display position, size, and transparency of the virtual object based on the information read from the memory 128.

As a result, the virtual objects before the attitude operation and the virtual objects after the attitude operation can be visually recognized at the same time, and it is possible to identify the virtual objects more reliably.

Although FIG. 12 shows an example in which the area 901 for displaying the virtual objects after the attitude operation is arranged below the frame of the display visual field screen, the area 901 may be arranged above the frame of the display visual field screen.

Also, although FIG. 12 and FIG. 13 show an example in which the virtual objects are arranged in the horizontal direction of the screen in the areas 901 and 1001 for displaying the virtual objects after the attitude operation, the virtual objects may be arranged in the vertical direction of the screen. The areas 901 and 1001 may be arranged at any positions on the screen.

Example of Batch Display of Virtual Objects

Next, an example of a batch display of the virtual objects using a small object instead of the batch display of virtual objects by the full spherical image shown in FIG. 5 will be described.

Figure 14:
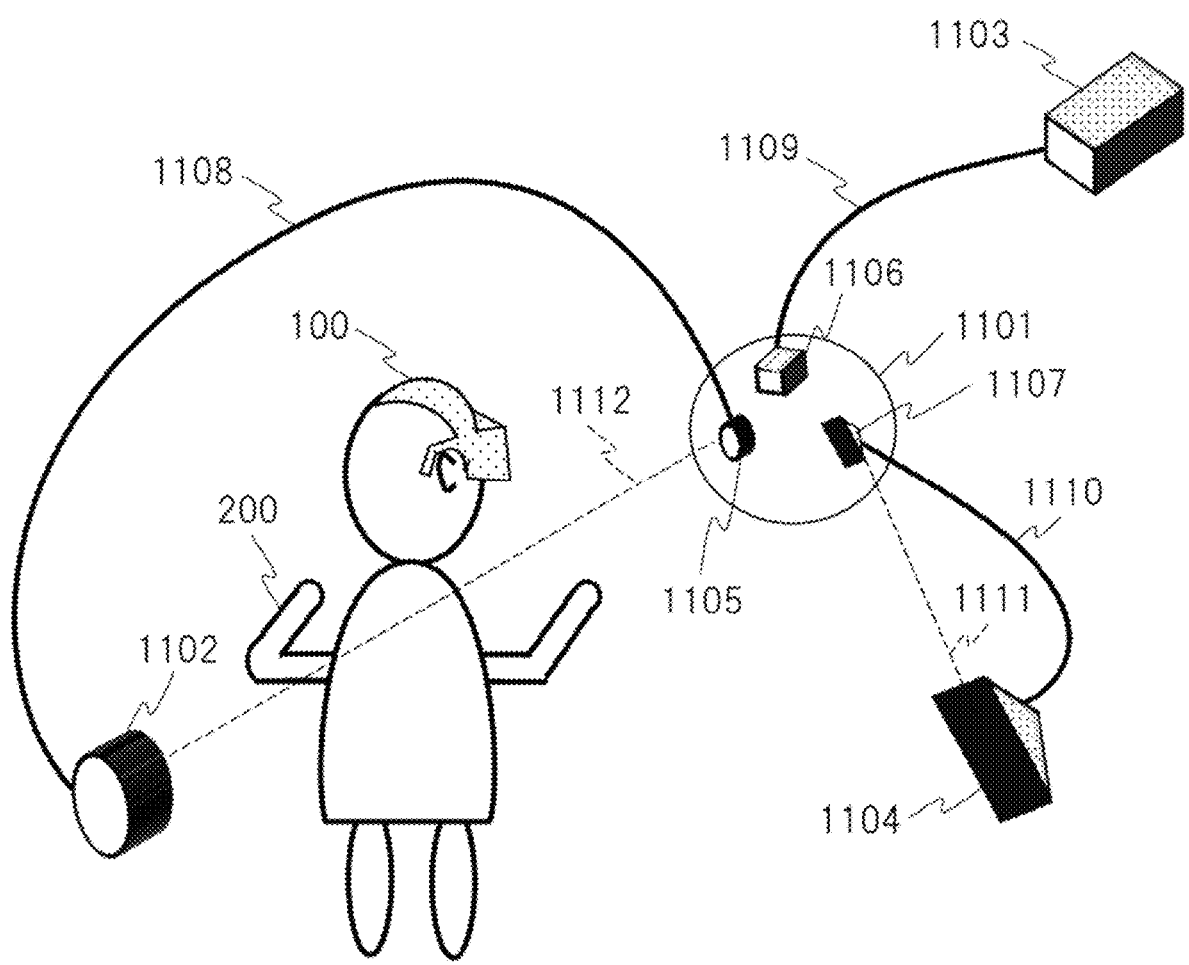
FIG. 14 is an explanatory diagram schematically showing an arrangement example of a small virtual object in the head-mounted information processing apparatus in FIG. 1.

FIG. 14 is an explanatory diagram schematically showing an arrangement example of a small virtual object in the head-mounted information processing apparatus 100 in FIG. 1.

FIG. 14 shows an arrangement example of virtual objects around the head-mounted information processing apparatus and a virtual small object.

Figure 15:
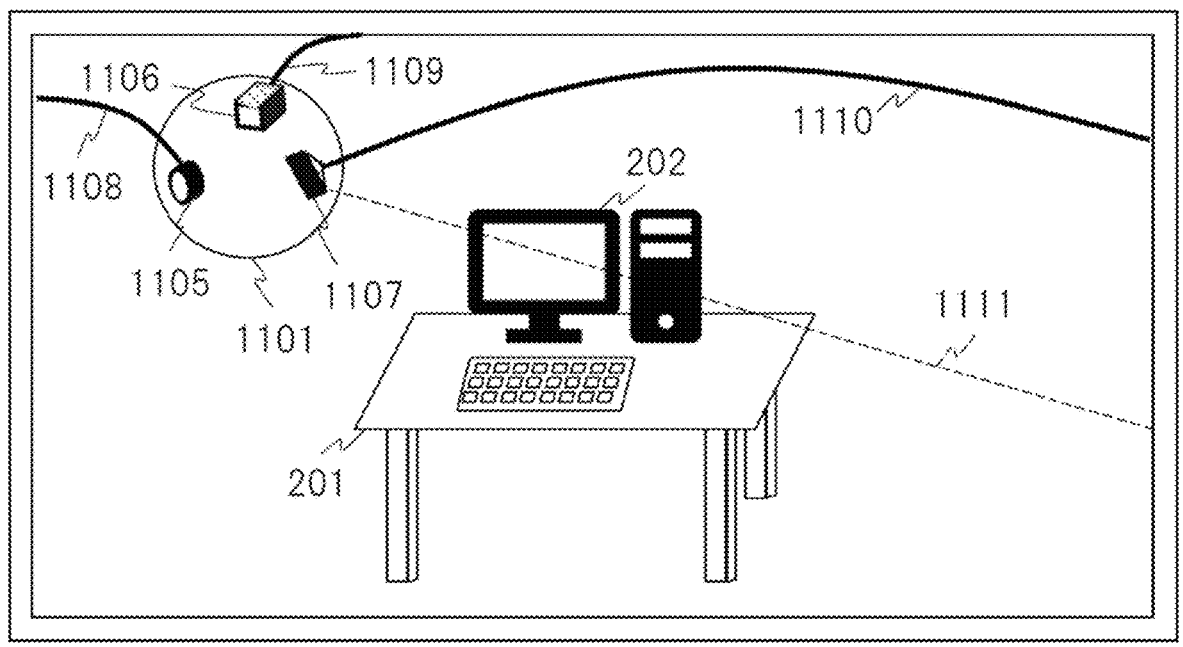
FIG. 15 is an explanatory diagram showing an example of a display visual field screen in the arrangement example shown in FIG. 14.

FIG. 15 is an explanatory diagram showing an example of a display visual field screen in the arrangement example shown in FIG. 14.

FIG. 15 shows an example in which small models which are miniatures of the virtual objects are arranged on the virtual small object so as to correspond to the existence positions of the virtual objects and the virtual small object is displayed to be superimposed on the visual field of the real space, in the state where the user wearing the head-mounted information processing apparatus 100 is seeing forward in the arrangement example shown in FIG. 14.

In FIG. 14 and FIG. 15, the portions shown in FIG. 1 and FIG. 3 and denoted with the same reference characters have the same operations as those already described in FIG. 1 and FIG. 3, and therefore detailed description thereof will be omitted.

As shown in FIG. 14, a small sphere 1101 as an example of the small object is virtually provided in front of the user 200 wearing the head-mounted information processing apparatus 100. The sphere 1101 is an area in which miniatures 1105, 1106, and 1107 which are small models of virtual objects 1102, 1103, and 1104 are disposed and displayed, that is, a miniature display area.

The miniatures 1105, 1106, and 1107 are arranged in the sphere 1101 so as to correspond to the existence positions of the virtual objects 1102, 1103, and 1104.

Further, the virtual objects 1102, 1103, and 1104 and the corresponding miniatures 1105, 1106, and 1107 are associated with each other by being connected by virtual lines 1108, 1109, and 1110, respectively.

The desk 201 and the personal computer 202 are placed in front of the user 200, the storage box 203 is placed on the right side of the user 200, and the bookshelf 204 is placed behind the user 200, and the surrounding situation is the same as that described with reference to FIG. 3 (not shown in FIG. 14).

In the arrangement example shown in FIG. 14, on the display visual field screen of the display unit 130, the sphere 1101 in which the miniatures 1105, 1106, and 1107 of the virtual objects 1102, 1103, and 1104 are arranged is displayed in the upper left of the display visual field so as to be superimposed on the desk 201 and the personal computer 202 in the field of view of the real space in front of the user 200 as shown in FIG. 15.

Therefore, as can be seen from the display screen example shown in FIG. 15, miniatures of all virtual objects around the position of the user 200 wearing the head-mounted information processing apparatus 100 are projected and displayed in the sphere 1101 so as to be superimposed on the real space. In this way, the batch display of the virtual objects by miniatures can be realized.

Further, by tracing the virtual lines 1108, 1109, and 1110 connecting the virtual objects 1102 to 1104 and the miniatures 1105 to 1107, the user 200 can easily estimate the existence positions of the virtual objects.

Note that, if the virtual object 1102 and its miniature 1105 are connected by a virtual line such as a virtual line 1112 shown by a dotted line in FIG. 14, the virtual line penetrates the body of the user 200.

In such a case, there is a possibility that it is difficult to grasp the positional relationship between the virtual object and the miniature of the virtual object. Therefore, for example, the virtual object 1102 and its miniature 1105 are connected with a curved line so as to avoid the body of the user 200 as shown by the virtual line 1108, thereby making it easier to trace the virtual line. As a result, it is possible to easily estimate the existence position of the virtual object.

The controller 125 reads the data and coordinate information of the virtual object stored in the memory 128, generates the sphere 1101, the miniatures 1105, 1106, and 1107 of the virtual objects 1102, 1103, and 1104, and the virtual lines 1108, 1109, and 1110, etc. shown in FIG. 15 as display images in accordance with the program 126 stored in the memory 128, and displays them on the display unit 130. When the attitude operation of the virtual object is required, the virtual object attitude operation processor 123 performs the processing as appropriate.

When connecting a miniature and a virtual object by a virtual line, the virtual line may overlap with the real object in some cases. For example, a virtual line 1111 connecting the miniature 1107 and the virtual object 1104 shown in FIG. 15 overlaps with the desk 201, the personal computer 202, and the like.

In such a case, as shown in FIG. 15, the curved virtual line 1110 is used as the virtual line connecting the miniature 1107 and the virtual object 1104 so as not to overlap with the real object. This makes it easier to trace the virtual line and to estimate the existence position of the virtual object.

Figure 16:
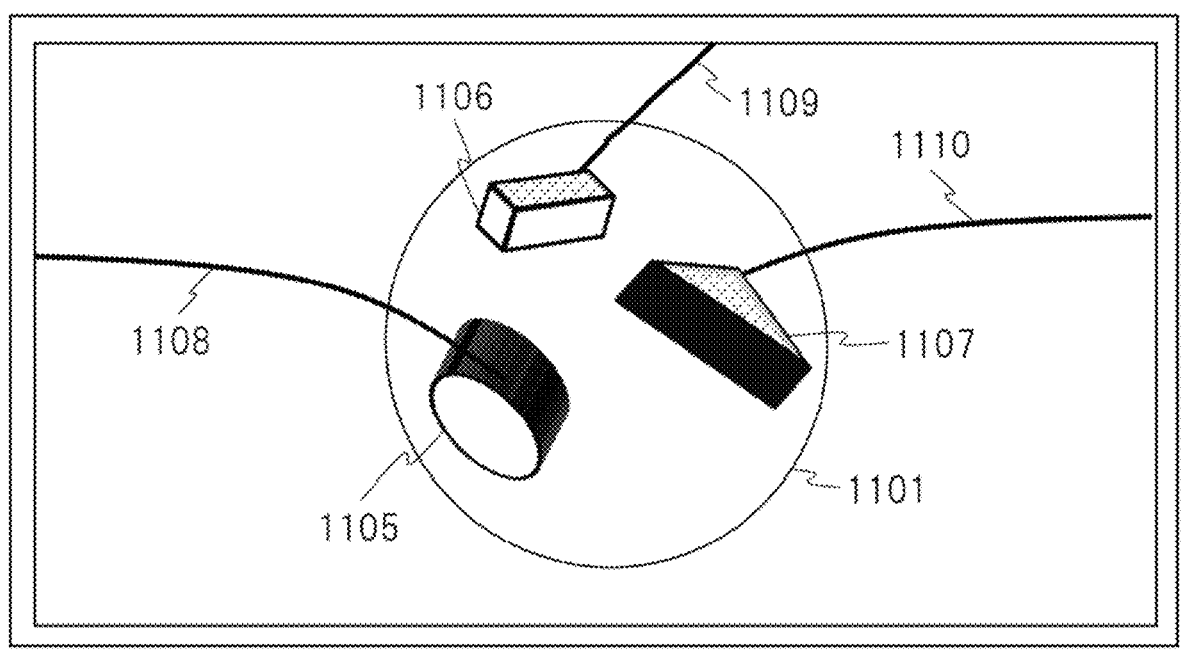
FIG. 16 is an explanatory diagram showing an example of a display of the small object in the head-mounted information processing apparatus in FIG. 1.

Further, as shown in FIG. 16, the shapes of the miniatures 1105, 1106, and 1107 of the virtual objects arranged in the sphere 1101 can be easily recognized by moving the sphere 1101 to the near side at approximately the center of the display screen while expanding and rotating it by the operation of the user 200. In this way, the entire shapes of the virtual objects and the like can be visually recognized more accurately.

Example of Display Visual Field Screen

Figure 17:
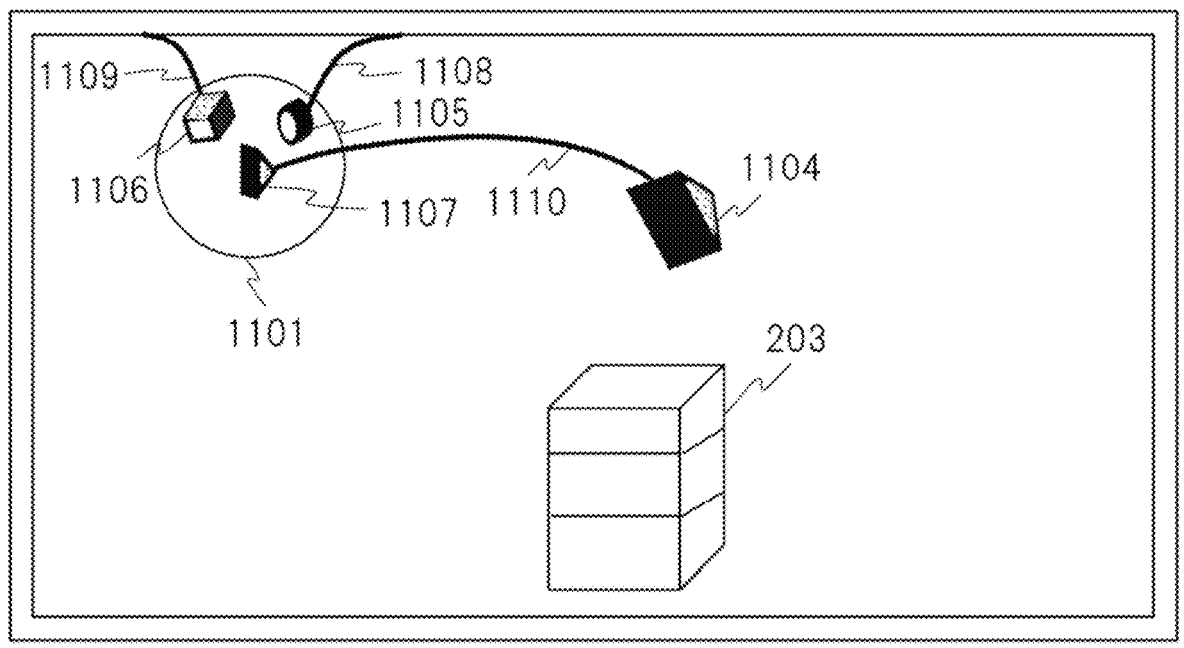
FIG. 17 is an explanatory diagram showing an example of a display visual field screen in the display unit in the head-mounted information processing apparatus in FIG. 1.

FIG. 17 is an explanatory diagram showing an example of the display visual field screen in the display unit 130 in the head-mounted information processing apparatus 100 in FIG. 1.

FIG. 17 shows the display visual field screen in the case where the user 200 turns from the front to face the right side.

In FIG. 17, the portions shown in FIG. 1, FIG. 3, and FIG. 14 and denoted with the same reference characters have the same operations as those already described in FIG. 1, FIG. 3, and FIG. 14, and therefore detailed description thereof will be omitted.

First, when the orientation of the user 200 moves from the front to the right side, the storage box 203 which is a real object on the right side is located at the center of the field of view as shown in FIG. 17. Along with this, the virtual object 1104 existing above the storage box 203 is displayed at the upper center of the display screen.

Further, the sphere 1101 itself is displayed in the upper left corner of the display visual field, but the miniatures 1105 to 1107 of the respective virtual objects in the sphere 1101 are displayed in the form rotated to right in response to the movement of the orientation of the user to the right.

Namely, as shown in FIG. 17, the miniatures 1105 to 1107 are rotated and displayed such that the miniature 1107 is located at the center of the sphere 1101. Also, the virtual object 1104 displayed at the center of the display screen of the display unit 130 and the miniature 1107 of the virtual object 1104 are displayed as being connected by the virtual line 1110.

Namely, when the user 200 wearing the head-mounted information processing apparatus 100 changes the orientation to face, the position of the sphere 1101 in the display visual field does not change, but the sphere 1101 rotates in accordance with the orientation of the user, and the arrangement angles of the miniatures 1105 to 1107 in the sphere 1101 change in accordance with the orientation of the user 200. In response to this, the virtual line 1110 connecting the miniature 1107 in the sphere 1101 and the virtual object 1104 is also changed to be drawn again.

Then, even when the user 200 wearing the head-mounted information processing apparatus 100 changes the orientation to face, for example, even when the user 200 changes the orientation from the front to the right side, the user 200 can recognize all virtual objects around the user 200 by the miniature batch display in the sphere 1101 displayed in the display screen of the display unit 130.

Further, by tracing the virtual line connected to the actual virtual object from the miniature in the sphere 1101, the user 200 can easily recognize the position of the actual virtual object from the miniature in the sphere 1101. Further, it is also possible to estimate the position of the virtual object based on the direction and bending of the virtual line.

Note that the orientation of the head-mounted information processing apparatus 100 itself and the movement such as the rotation thereof can be grasped by analyzing the change in the information of the outside world caused by the change in the attitude of the user. In this way, the change level of the head-mounted information processing apparatus 100 can be grasped.

Therefore, it is possible to recognize the change in the display state of the virtual object, such as the entering of the virtual object, which has originally existed at a position outside the display visual field, into the display visual field due to the change in the orientation of the head-mounted information processing apparatus 100. As a result, it is possible to display the virtual object at the desired position.

Here, the acceleration sensor 114, the gyro sensor 115, the geomagnetic sensor 116, and the like provided in the head-mounted information processing apparatus 100 are used to detect the orientation of the head-mounted information processing apparatus 100 itself and the movement such as the rotation thereof.

Alternatively, the orientation of the head-mounted information processing apparatus 100 itself and the movement such as the rotation thereof can be acquired by analyzing the change in the information of the outside world caused by the change in the attitude of the user obtained by the camera 111, the depth sensor 131, and the like.

Figure 18:
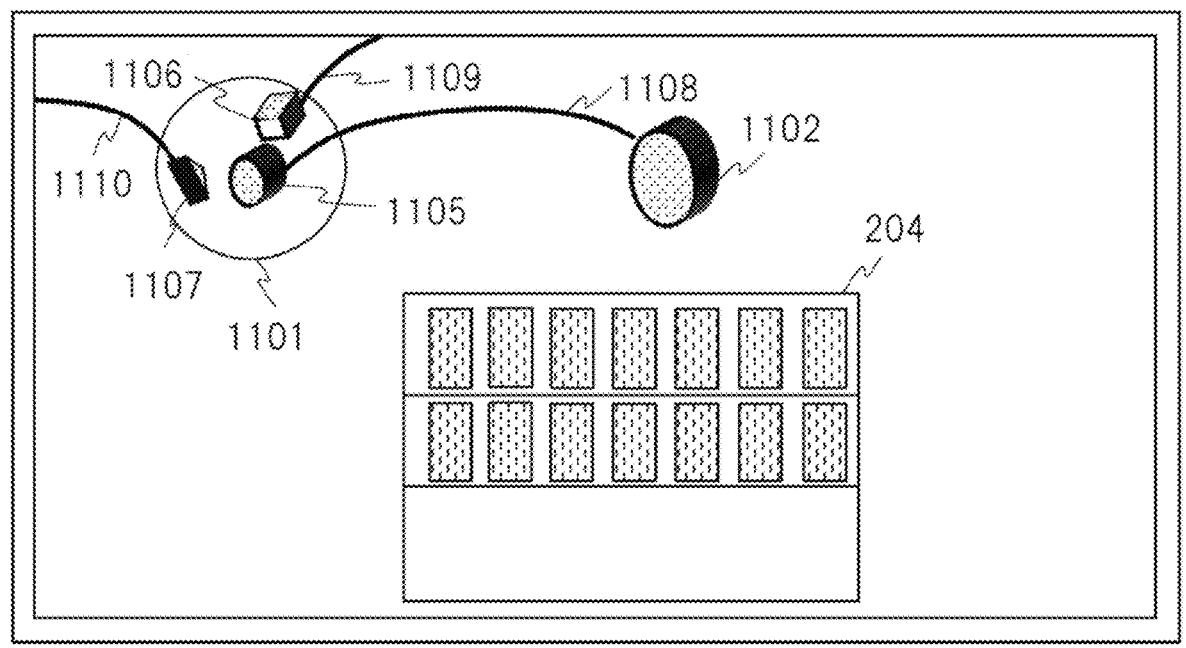
FIG. 18 is an explanatory diagram showing another example of the display visual field screen in the display unit in the head-mounted information processing apparatus in FIG. 1.

FIG. 18 is an explanatory diagram showing another example of the display visual field screen in the display unit 130 in the head-mounted information processing apparatus 100 in FIG. 1.

FIG. 18 shows an example of the display visual field screen when the user changes the orientation from the front to the back side.

In FIG. 18, the portions shown in FIG. 1, FIG. 3, and FIG. 14 and denoted with the same reference characters have the same operations as those already described in FIG. 1, FIG. 3, and FIG. 14, and therefore detailed description thereof will be omitted.

When the orientation of the user 200 changes to the back side, the bookshelf 204 at the back is located at the center of the field of view and the virtual object 1102 existing above the bookshelf 204 is displayed at the upper center of the display screen of the display unit 130 as shown in FIG. 18.

Also, the sphere 1101 itself is displayed in the upper left corner of the display visual field, but the sphere 1101 and the miniatures of the respective virtual objects in the sphere 1101 are displayed in the form rotated backward in response to the movement of the orientation of the user 200 to the back side.

Namely, as shown in FIG. 18, the sphere 1101 is rotated such that the miniature 1105 of the virtual object 1102 displayed at the upper center of the display screen is located at the center of the sphere 1101. In the sphere 1101, each of the miniatures 1105, 1106, and 1107 is displayed in an arranged form.

Further, the virtual object 1102 displayed at the center of the display screen and the miniature 1105 of the virtual object 1102 are displayed as being connected by the virtual line 1108. Namely, when the user 200 wearing the head-mounted information processing apparatus 100 changes the orientation to face, the position of the sphere 1101 in the display visual field does not change, but the sphere 1101 rotates in accordance with the orientation of the user, and the arrangement angles of the miniatures in the sphere 1101 change in accordance with the change in the orientation of the user. Further, the virtual line connecting the miniature in the sphere 1101 and the virtual object is also changed to be drawn again.

Then, as in the description with reference to FIG. 17, even when the user wearing the head-mounted information processing apparatus 100 changes the orientation to face, for example, even when the user changes the orientation from the front to the back side, the user can recognize all virtual objects around the user by the miniature batch display in the sphere 1101 displayed in the display screen so as to be superimposed on the real space in the orientation in which the user 200 faces.

Further, by tracing the virtual line 1108 connected to the actual virtual object 1102 from the miniature 1105 in the sphere 1101, the user 200 can easily recognize the position of the actual virtual object 1102 from the miniature 1105 in the sphere 1101.

FIG. 19 is an explanatory diagram showing an example of a display screen in the case where a full spherical image by the head-mounted information processing apparatus 100 in FIG. 1 is displayed as a background.

In FIG. 19, the portions shown in FIG. 1, FIG. 3, and FIG. 14 and denoted with the same reference characters have the same operations as those already described in FIG. 1, FIG. 3, and FIG. 14, and therefore detailed description thereof will be omitted.

In the case of the display example shown in FIG. 19, all the virtual objects can be displayed within the display screen together with the sphere 1101 in which the miniatures of the virtual objects are arranged, and the arrangement positions of the virtual objects can be easily visually recognized.

In the foregoing, the case of using a small sphere as a small object has been described, but a small object having a shape corresponding to the space in which the virtual objects exist may be used. In that case, it is possible to achieve the effect that the relationship with the actual space can be easily recognized. For example, in the case of a cubic closed space such as a room, a small cubic object may be used.

In addition, the small object may be separately provided for each type of virtual object. For example, a number of color-coded small objects in a reduced state may be arranged, and only the information of the group of virtual objects associated with the selected small object may be displayed. Alternatively, all virtual objects may be displayed by stacking small objects.

Further, when it is not necessary to display the small object, an operation such as temporarily hiding it is also possible. Also, when displaying the miniature of the virtual object, a specific symbol such as "☆" may be used regardless of the actual shape, or the symbol may be color-coded for each type of the virtual object.

Displaying the miniature of the virtual object in a simplified manner in this way is effective when the existence of the virtual object is roughly visually recognized.

Further, instead of constantly displaying the small object fixedly within the display visual field, the small object may be fixedly displayed at a specific spatial position. In this case, when the user changes the orientation, the small object is out of the display visual field. In addition, not only the small object but also the line is fixed, but it becomes easy for the user to avoid the position confusion of the virtual objects and the small object due to the change in the viewing direction.

As to the line connecting the miniature of the virtual object on the small object and the actual virtual object, the color of the line, the thicknesses of the line, the type of the line, and the like may be changed depending on the type of the virtual object.

For example, a thin black line may be used for a document window which is a virtual object, and a thick yellow dashed line may be used for a character which is a virtual object. Also, the user can display the preview of the connected virtual object in front of the user by touching the virtual line.

Alternatively, the user may move the actual virtual object to the front by the motion of grabbing and pulling the line, and can return it to the original position by the motion of throwing it up after use.

In the operation of making transition to the normal display in which the virtual object is displayed to be superimposed on the scenery in the real space, it is possible to draw a line to the object selected on the batch display screen by marking the virtual object before returning to the normal display.

Similarly, the selected virtual object can be traced visually by returning it slowly to its original position. These may be applied to all virtual objects regardless of whether the objects are selected or not.

In addition, when a request instruction is given by the user from the input operation unit 121 or the like or an operation such as the display operation is performed in the head-mounted information processing apparatus 100, information indicating the request instruction, the display operation, or the like may be displayed so as to notify the user of the information. In this way, the operating state of the head-mounted information processing apparatus can be reliably notified of the user and the user can surely recognize it.

Information indicating the request instruction, the display operation, and the like may be notified of the user by issuing a sound to the user from the headphones 120, generating vibrations by the vibration generator 117 that is in close contact with the user, or generating a stimulus by the stimulation generator 132.

As described above, even if the virtual object is out of the range of the visual field of the head-mounted information processing apparatus 100, the existence, shape, arrangement location, etc. of the virtual object can be accurately visually recognized.

As a result, it is possible to realize the head-mounted information processing apparatus 100 that can identify the virtual object conveniently.

Second Embodiment

Configuration Example of Head-Mounted Display System

FIG. 20 is a block diagram showing an example of a configuration in a head-mounted display system 1700 according to the second embodiment.

As shown in FIG. 20, the head-mounted display system 1700 includes the head-mounted information processing apparatus 100, a virtual object generation server 1702, and a network 1703.

The head-mounted information processing apparatus 100 shown in FIG. 20 is newly provided with a communication unit 1704 and a transmission/reception antenna 1705 in addition to the configuration of each functional block denoted with the same reference characters shown in FIG. 1. On the other hand, the head-mounted information processing apparatus 100 of FIG. 20 is not provided with the virtual object generation processor 122.

The virtual object generation server 1702 includes a virtual object generation processor 1711, a memory 1712, a controller 1713, a communication unit 1714, a transmission/reception antenna 1715, and the like. The functional blocks in the virtual object generation server 1702 are connected to each other via a bus 1720. In FIG. 20, the same functional blocks as those in the embodiment of FIG. 1 are denoted with the same reference characters, and the description thereof will be omitted.

In the head-mounted display system 1700, the virtual object generation processor 1711 included in the virtual object generation server 1702 generates virtual objects.

The memory 1712 stores the virtual objects generated by the virtual object generation processor 1711. The communication unit 1714 transmits the virtual objects stored in the memory 1712 from the transmission/reception antenna 1715 to the head-mounted information processing apparatus 100 via the network 1703 which is a communication network. The head-mounted information processing apparatus 100 receives the virtual objects transmitted via the network 1703.

Further, in FIG. 20, the display processing itself of the virtual objects in the head-mounted information processing apparatus 100 is the same as that in the case of the embodiment shown in FIG. 1, but the difference from the case of FIG. 1 is that the generation of the virtual objects is performed in the virtual object generation server 1702, which is the device separated from the head-mounted information processing apparatus 100.

In the virtual object generation server 1702, the memory 1712 is a non-volatile semiconductor memory such as a flash memory as in the memory 128 of the head-mounted information processing apparatus 100.

The memory 1712 stores various programs used by the controller 1713 of the virtual object generation server 1702, generated virtual objects, and the like. The communication unit 1714 is a communication interface that communicates with the head-mounted information processing apparatus 100 via the network 1703, and transmits/receives information to/from the head-mounted information processing apparatus 100.

The controller 1713 is composed of, for example, a CPU or the like, and controls each functional block by executing a program such as an OS or an operation control application stored in the memory 1712, thereby controlling the overall virtual object generation server 1702.

The controller 1713 controls the generation of the virtual objects in the virtual object generation processor 1711 and the storage of the generated virtual objects in the memory 1712. Further, the controller 1713 performs the control to transmit the generated virtual objects to the head-mounted information processing apparatus 100 in accordance with the transmission output request of the virtual object from the head-mounted information processing apparatus 100.

In this way, by generating the virtual objects by the use of the virtual object generation server 1702 separated from the head-mounted information processing apparatus 100 instead of the head-mounted information processing apparatus 100, it is possible to increase the amount of virtual object information that can be handled. Further, it is possible to generate and distribute the requested virtual objects to the plurality of head-mounted information processing apparatuses 100 at plural locations at the same time.

As a result, it is possible to easily visually recognize the overall picture of the virtual objects conveniently in the plurality of head-mounted information processing apparatuses 100 at the same time.

In the foregoing, the invention made by the inventors has been specifically described above based on the embodiments, but it is needless to say that the present invention is not limited to the embodiments described above and can be variously modified within the range not departing from the gist thereof.

Note that the present invention is not limited to the embodiments described above and includes various modifications. For example, the embodiments above have been described in detail in order to make the present invention easily understood, and the present invention is not necessarily limited to the embodiments having all of the described configurations.

Also, part of the configuration of one embodiment may be replaced with the configuration of another embodiment, and the configuration of one embodiment may be added to the configuration of another embodiment. Furthermore, another configuration may be added to part of the configuration of each embodiment, and part of the configuration of each embodiment may be eliminated or replaced with another configuration.

In addition, each configuration, function, processor, processing function, and the like described above may be realized by hardware by designing part or all of them by, for example, integrated circuits. Further, each configuration, function, and the like described above may be realized by software by interpreting and executing the program for realizing each function by the processor. Information such as programs, tables, and files for realizing each function can be stored in a memory, a storage device such as a hard disk or an SSD (Solid State Drive), or a storage medium such as an IC card, an SD card, or a DVD.

Also, the control lines and information lines that are considered to be necessary for explanation are shown, and all of the control lines and information lines in the product are not necessarily shown. In practice, it is safe to assume that almost all configurations are connected to each other.

REFERENCE SIGNS LIST

100 head-mounted information processing apparatus
111 camera
112 right-eye gaze detector
113 left-eye gaze detector
114 acceleration sensor
115 gyro sensor
116 geomagnetic sensor
117 vibration generator
118 ambient sound microphone
119 voice microphone
120 headphones
121 input operation unit
122 virtual object generation processor
123 virtual object attitude operation processor
124 virtual object transformation operation processor
125 controller
128 memory
130 display unit
131 depth sensor
132 stimulus generator
140 bus
1700 head-mounted display system
1702 virtual object generation server
1703 network
1711 virtual object generation processor
1712 memory
1713 controller
1714 communication unit
1715 transmission/reception antenna
1720 bus

The invention claimed is:

1. A head-mounted information processing apparatus comprising:
   processing circuitry configured to
      generate a plurality of virtual objects, each of which having a coordinate position in a three dimensional space, and
      receive virtual object display instruction information for instructing display of the plurality of virtual objects;
   a camera configured to capture a real space; and
   a display configured to display a photographed image captured by the camera and the plurality of virtual objects, wherein the processing circuitry is configured to control the display to display, within a display visual field screen of the display, (1) a first virtual object of the plurality of virtual objects, the first virtual object being located virtually at a first coordinate position within a visual field of a user, and (2) a second virtual object of the plurality of virtual objects, the second virtual object being located virtually at a second coordinate position outside the visual field of the user, in accordance with the virtual object display instruction information,
   wherein the processing circuitry is configured to:
      generate a plurality of miniatures, each of which is a small model of each of the plurality of virtual objects,
      generate a miniature display area in which the plurality of miniatures are displayed,
      arrange the plurality of miniatures in the miniature display area, and
      control the display to display the plurality of miniatures in the miniature display area, and
   wherein the miniature display area has a spherical shape.

2. The head-mounted information processing apparatus according to claim 1, wherein
   the processing circuitry is configured to:
      receive attitude operation information to operate an attitude of at least one of the plurality of virtual objects displayed on the display; and
      control the attitude of the at least one of the plurality of virtual objects based on the received operation information.

3. The head-mounted information processing apparatus according to claim 1, wherein
   the processing circuitry is configured to:
      in response to receiving the attitude operation information, control the attitude of the at least one of the plurality of virtual objects after moving the at least one of the plurality of virtual objects to a preset position within the display visual field screen of the display, and return the at least one of the plurality of virtual objects to an original display position within the display visual field screen of the display.

4. The head-mounted information processing apparatus according to claim 1, wherein the processing circuitry is configured to control the display to display a list of the plurality of virtual objects in a first display area within the display visual field screen and the plurality of virtual objects in a second display area different from the first display area within the display visual field screen.

5. The head-mounted information processing apparatus according to claim 1, wherein the processing circuitry is configured to control the display to display a list of the plurality of virtual objects within the display visual field screen so as to be superimposed on a display area where the plurality of virtual objects are displayed within the display visual field screen.

6. A head-mounted information processing apparatus comprising:

processing circuitry configured to generate a plurality of virtual objects, each of which having a coordinate position in a three dimensional space, and receive virtual object display instruction information for instructing display of the plurality of virtual objects;

a camera configured to capture a real space; and a display configured to display a photographed image captured by the camera and the plurality of virtual objects, wherein the processing circuitry is configured to control the display to display, within a display visual field screen of the display, (1) a first virtual object of the plurality of virtual objects, the first virtual object being located virtually at a first coordinate position within a visual field of a user, and (2) a second virtual object of the plurality of virtual objects, the second virtual object being located virtually at a second coordinate position outside the visual field of the user, in accordance with the virtual object display instruction information, wherein the processing circuitry is configured to:

generate a plurality of miniatures, each of which is a small model of each of the plurality of virtual objects, generate a miniature display area in which the plurality of miniatures are displayed, arrange the plurality of miniatures in the miniature display area, and control the display to display the plurality of miniatures in the miniature display area, and wherein the processing circuitry is configured to:

generate a plurality of virtual lines, each of which is connecting each of the plurality of virtual objects and each of the plurality of miniatures each corresponding to the each of the plurality of virtual objects having the same shape, and control the display to display the virtual line.

7. The head-mounted information processing apparatus according to claim 6, wherein the processing circuitry is configured to:

receive attitude operation information to operate an attitude of at least one of the plurality of virtual objects displayed on the display; and control the attitude of the at least one of the plurality of virtual objects based on the received operation information.

8. The head-mounted information processing apparatus according to claim 6, wherein the processing circuitry is configured to:

in response to receiving the attitude operation information, control the attitude of the at least one of the plurality of virtual objects after moving the at least one of the plurality of virtual objects to a preset position within the display visual field screen of the display, and return the at least one of the plurality of virtual objects to an original display position within the display visual field screen of the display.

9. The head-mounted information processing apparatus according to claim 6, wherein the processing circuitry is configured to control the display to display a list of the plurality of virtual objects in a first display area within the display visual field screen and the plurality of virtual objects in a second display area different from the first display area within the display visual field screen.

10. The head-mounted information processing apparatus according to claim 6, wherein the processing circuitry is configured to control the display to display a list of the plurality of virtual objects within the display visual field screen so as to be superimposed on a display area where the plurality of virtual objects are displayed within the display visual field screen.

11. A head-mounted information processing apparatus comprising:

processing circuitry configured to generate a plurality of virtual objects, each of which having a coordinate position in a three dimensional space, and receive virtual object display instruction information for instructing display of the plurality of virtual objects;

a camera configured to capture a real space, and a display configured to display a photographed image captured by the camera and the plurality of virtual objects, wherein the processing circuitry is configured to control the display to display, within a display visual field screen of the display, (1) a first virtual object of the plurality of virtual objects, the first virtual object being located virtually at a first coordinate position within a visual field of a user, and (2) a second virtual object of the plurality of virtual objects, the second virtual object being located virtually at a second coordinate position outside the visual field of the user, in accordance with the virtual object display instruction information, wherein the processing circuitry is configured to control the display to display the second virtual object by displaying a full spherical image that includes the second coordinate position outside the visual field of the user.

12. The head-mounted information processing apparatus according to claim 11, wherein the camera is a full spherical camera configured to capture a full spherical image, and wherein the processing circuitry is configured to control the display to display the full spherical image captured by the camera.

13. The head-mounted information processing apparatus according to claim 11, wherein the processing circuitry is configured to:
- receive selection information that selects at least one of the plurality of virtual objects;
- enlarge the at least one of the plurality of virtual objects that has been selected based on the selection information; and
- move the at least one of the plurality of virtual objects that has been selected to a preset position within the display visual field screen of the display.

14. The head-mounted information processing apparatus according to claim 11,
wherein the processing circuitry is configured to:
- generate a plurality of miniatures, each of which is a small model of each of the plurality of virtual objects,
- generate a miniature display area in which the plurality of miniatures are displayed,
- arrange the plurality of miniatures in the miniature display area, and
- control the display to display the plurality of miniatures in the miniature display area.

15. The head-mounted information processing apparatus according to claim 11,
wherein the processing circuitry is configured to control the display to display a list of the plurality of virtual objects in a first display area within the display visual field screen and the plurality of virtual objects in a second display area different from the first display area within the display visual field screen.

16. The head-mounted information processing apparatus according to claim 11,
wherein the processing circuitry is configured to control the display to display a list of the plurality of virtual objects within the display visual field screen so as to be superimposed on a display area where the plurality of virtual objects are displayed within the display visual field screen.

17. A head-mounted information processing apparatus comprising:
processing circuitry configured to
- generate a plurality of virtual objects, each of which having a coordinate position in a three dimensional space, and
- receive virtual object display instruction information for instructing display of the plurality of virtual objects;

a camera configured to capture a real space; and
a display configured to display a photographed image captured by the camera and the plurality of virtual objects, wherein the processing circuitry is configured to control the display to display, within a display visual field screen of the display, (1) a first virtual object of the plurality of virtual objects, the first virtual object being located virtually at a first coordinate position within a visual field of a user, and (2) a second virtual object of the plurality of virtual objects, the second virtual object being located virtually at a second coordinate position outside the visual field of the user, in accordance with the virtual object display instruction information,
wherein the second virtual object is arranged virtually behind a real object in the real space, and
the processing circuitry is configured to control the display to display the second virtual object by displaying the second virtual object in front of the real object.

18. The head-mounted information processing apparatus according to claim 17,
wherein the processing circuitry is configured to control the display to display a list of the plurality of virtual objects in a first display area within the display visual field screen and the plurality of virtual objects in a second display area different from the first display area within the display visual field screen.

19. The head-mounted information processing apparatus according to claim 17,
wherein the processing circuitry is configured to control the display to display a list of the plurality of virtual objects within the display visual field screen so as to be superimposed on a display area where the plurality of virtual objects are displayed within the display visual field screen.

20. The head-mounted information processing apparatus according to claim 17,
wherein the processing circuitry is configured to:
- generate a plurality of miniatures, each of which is a small model of each of the plurality of virtual objects,
- generate a miniature display area in which the plurality of miniatures are displayed,
- arrange the plurality of miniatures in the miniature display area, and
- control the display to display the plurality of miniatures in the miniature display area.

* * * * *